(12) United States Patent
Yoshida et al.

(10) Patent No.: US 6,421,115 B2
(45) Date of Patent: Jul. 16, 2002

(54) DISTANCE MEASURING APPARATUS

(75) Inventors: Hideo Yoshida; Yoshikazu Mihara, both of Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/900,015

(22) Filed: Jul. 9, 2001

(30) Foreign Application Priority Data

Jul. 7, 2000 (JP) ........................................ 2000-207451

(51) Int. Cl.[7] .............................. G01C 3/00; G03B 3/00; G03B 13/00
(52) U.S. Cl. ...................... 356/3.04; 396/98; 396/106; 396/120; 396/125
(58) Field of Search ...................... 356/3.04; 396/106, 396/98, 120, 125

(56) References Cited

U.S. PATENT DOCUMENTS

| | | | | |
|---|---|---|---|---|
| 5,444,511 A | * | 8/1995 | Seki et al. | |
| 5,614,984 A | * | 3/1997 | Seki et al. | 396/106 |
| 6,026,246 A | * | 2/2000 | Yoshida et al. | 396/106 |
| 6,057,910 A | * | 5/2000 | Dunne | 356/5.05 |
| 6,181,877 B1 | | 1/2001 | Yoshida | |
| 6,259,514 B1 | | 7/2001 | Yoshida | |

FOREIGN PATENT DOCUMENTS

| | | |
|---|---|---|
| JP | 8-94919 | 4/1996 |
| JP | 8-94920 | 4/1996 |

* cited by examiner

Primary Examiner—Stephen C. Buczinski
(74) Attorney, Agent, or Firm—Leydig, Voit & Mayer, Ltd.

(57) ABSTRACT

When the reflectance of an object at a distance to be measured is low and when the distance to the object is far, these conditions are discriminated and the distance is measured with a clamp signal set at a low level, thereby enhancing distance measurement accuracy. First a distance measurement is carried out with the clamp signal set at a high level. When the first distance value is larger than a predetermined distance, a second distance measurement is carried out with the clamp signal set at the low level. Then it is determined whether the second distance value is larger than a set value. When the second distance value is larger than the set value, the clamp signal is set to the high level and third a distance measurement is carried out. When the second distance value is not larger than the set value, on the other hand, the clamp signal is set to the low level under certain conditions and the third distance measurement is carried out.

10 Claims, 23 Drawing Sheets

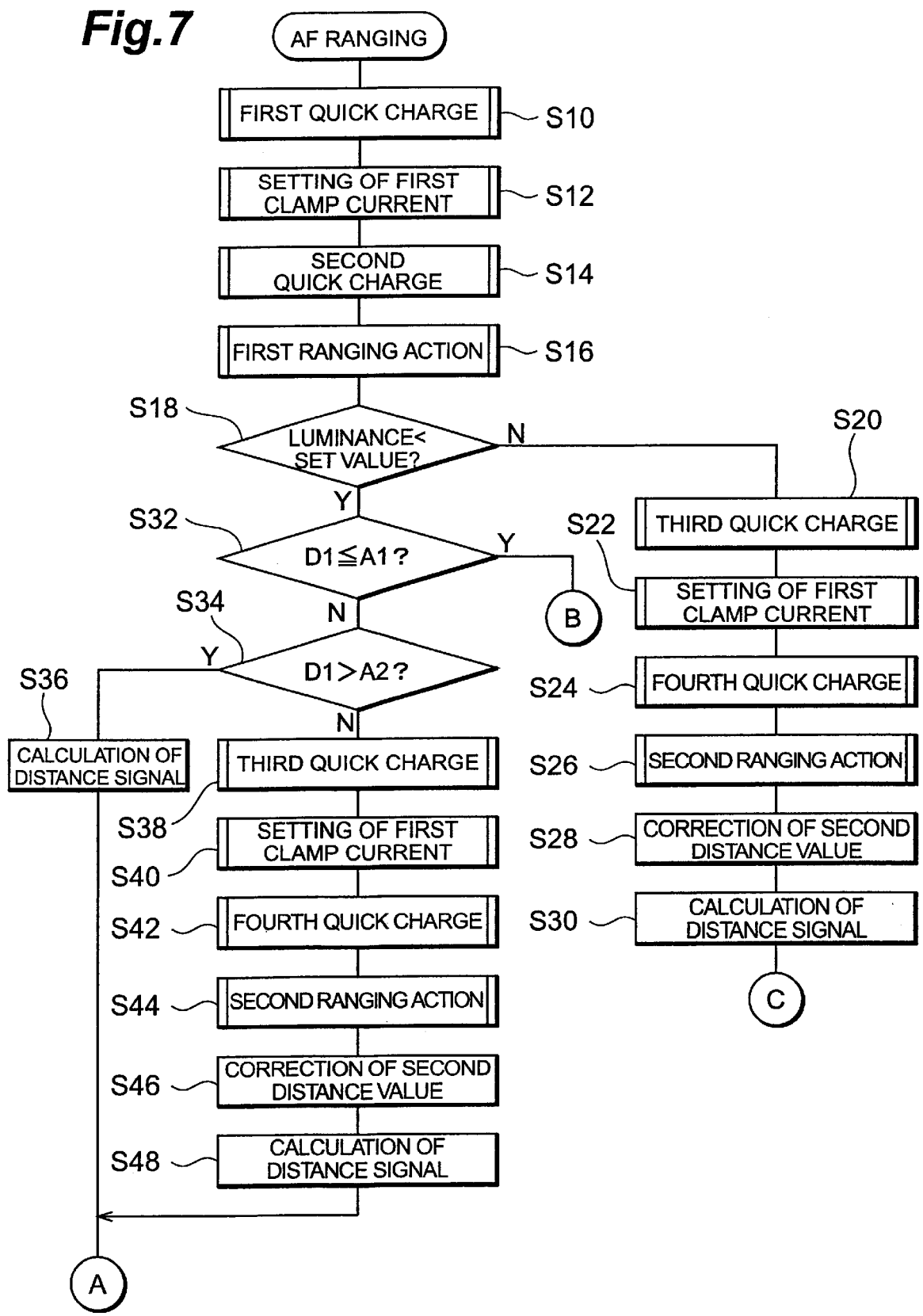

ADDITION OF D*+D*>C AND D2-D1>E1
(REFLECTANCE 36%, E2=312, E1=30)

ADDITION OF D*+D*>C AND D2-D1>E1
(REFLECTANCE 9%, E2=312, E1=30)

PRIOR ART

PRIOR ART

PRIOR ART

PRIOR ART

PRIOR ART

PRIOR ART

PRIOR ART

DISTANCE MEASURING APPARATUS

BACKGROUND OF THE INVENTION

1. Field of the Invention

The present invention relates to distance measuring apparatus for measuring the distance to an object to be measured and, more particularly, to distance measuring apparatus of an active type suitably applicable to cameras and others.

2. Related Background Art

The distance measuring apparatus of the active type used in the cameras and others is configured to project light from an infrared emitting diode (which will be referred hereinafter as "IRED") toward an object to be measured, receive reflection of the projected light by a position sensitive device (which will be referred to hereinafter as "PSD"), arithmetically process signals outputted from this PSD by a signal processing circuit and an arithmetic circuit to provide distance information, and determine the distance to the object by a CPU. Since distance measurement with only one light projection can produce an error, it is common practice to perform a plurality of light projections to obtain a plurality of distance information and integrate the plurality of distance information by an integrating circuit to average the information.

The conventionally known distance measuring devices of this active type include those described in Japanese Patent Applications Laid-open No. H08-94919 and No. H08-94920. FIG. 22 is a block diagram of the distance measuring apparatus described in these applications, which will be referred to as the distance measuring apparatus according to the first prior art.

In the distance measuring apparatus shown in FIG. 22, a driver 112 drives the IRED 114 under control of CPU 110 to make it output infrared light, and the infrared light is projected through a projection lens (not shown) toward an object to be measured. The infrared light reflected by the object is converged through a receiving lens (not shown) on the PSD 116, and the PSD 116 outputs two signals I1 and I2 according to a position where the reflection of the infrared light is received. A first signal processing circuit 118 removes a stationary light component of noise included in the signal I1 and a second signal processing circuit 120 a stationary light component of noise included in the signal I2.

An arithmetic circuit 132 calculates an output ratio (I1/(I1+I2)), based on the signals I1 and I2 obtained after the removal of the stationary light components, and outputs an output ratio signal according to the distance to the object. An integrating circuit 134 integrates a multiplicity of output ratio signals outputted in this way from the arithmetic circuit 132 to improve an S/N ratio. This integrating circuit 134 outputs a signal (hereinafter referred to as "AF signal") according to the distance to the object. Then the CPU 110 executes a predetermined operation to obtain a distance signal, based on the AF signal outputted from the integrating circuit 134, and controls a lens driving circuit 136, based on this distance signal, to move a lens 138 to an in-focus position.

FIG. 23 is a drawing showing a relation between the AF signal outputted from the integrating circuit 134 of the first prior art and the distance to the object. In the graph shown in this drawing, the abscissa represents the inverse (1/L) of the distance L to the object and the ordinate the output ratio (I1/(I1+I2)) or the AF signal. As shown in this figure, the output ratio is substantially in a linear relation to the inverse (1/L) of the distance L in the range not more than a certain distance L4. Thus the output ratio becomes smaller as the distance L increases (or as 1/L decreases). In the range not less than the distance L4, however, the influence of the noise component becomes larger to the contrary with increase in the distance L. When the noise component is denoted by In (In≧0), the output ratio is given by (I1+In)/(I1+In+I2+In). In the range larger than the distance L4, the output ratio varies so as to increase (i.e., toward the output ratio of 50%). In addition, since In occurs at random, the output ratio becomes unstable depending upon measurement conditions. The reason is that with increase in the distance L the intensity of the reflected light received by the PSD 116 becomes smaller and the noise component In becomes relatively larger. With occurrence of this phenomenon, the distance L to the object cannot be uniquely determined from the output ratio.

For this reason, as shown in FIG. 24, a clamping circuit 130 is interposed between the second signal processing circuit 120 and the arithmetic circuit 132 to compare the far signal I2 outputted from the second signal processor 120, with a clamp signal Ic and output the clamp signal Ic when the far signal I2 is smaller than the clamp signal Ic. Even in this structure, however, the distance output is fixed at a certain distance on the far side, as shown in FIG. 27 described hereinafter, and there occurs great deviation from designed values.

The distance measuring devices giving a solution to this problem include those described below. FIG. 25 is a block diagram of the distance measuring apparatus according to the second prior art. This figure shows only the structure on the photoreceptive side. In the distance measuring apparatus shown in this figure, the signals I1 and I2 outputted from the PSD 140 are supplied to respective stationary light removing circuits 142 and 144 to remove the stationary light component therefrom and thereafter the resultant signals are given to respective arithmetic circuits 146 and 148. The arithmetic circuit 146 performs an operation of I1/(I1+I2) to obtain an output ratio, based on the signals I1 and I2 after the removal of the stationary light components, and the integrating circuit 150 integrates the output ratio. On the other hand, the arithmetic circuit 148 performs an operation of I1+I2 to obtain the quantity of light and the integrating circuit 152 integrates the quantity of light. Then a selection part 160 selects either one of the output ratio and the quantity of light and calculates the distance to the object, based on the selected. The selection part 160 is a process in the CPU.

FIG. 26 is a block diagram of the distance measuring apparatus according to the third prior art. This figure also shows only the structure on the photoreceptive side. In the distance measuring apparatus shown in this figure, the signals I1 and I2 outputted from the PSD 170 are supplied to respective stationary light removing circuits 172 and 174 to remove the stationary light component therefrom and thereafter either of the resultant signals is given to one end of switch 176. Under control of the CPU, this switch 176 supplies either of the outputs from the stationary light removing circuits 172 and 174 into the integrating circuit 178. The integrating circuit 178 integrates either one of the input signals I1 and I2. An arithmetic part 180 executes an operation of I1/(I1+I2) to obtain an output ratio, based on the integration result, while an arithmetic part 182 does an operation of I1+I2 to obtain the quantity of light. Then a selection part 184 selects either one of the output ratio and the quantity of light and calculates the distance to the object, based thereon. The arithmetic parts 180, 182 and the selection part 184 are processes in the CPU.

These distance measuring devices (FIG. 25 and FIG. 26) according to the second and third prior arts are constructed both to calculate the distance L, based on the output ratio (I1/(I1+I2)), when the distance L to the object is small, but calculate the distance L, based on the light quantity (I1+I2), when the distance L is large, whereby the distance L can be uniquely determined.

As described above, the distance measuring devices according to the second and third prior arts (FIG. 25 and FIG. 26) are the apparatus that can give a solution to the problem of the distance measuring apparatus according to the first prior art (FIG. 22 and FIG. 24). However, the distance measuring apparatus of the second prior art (FIG. 25) needs to use the two sets of arithmetic circuits and integrating circuits and thus involves a problem of increase in the circuit scale and, in turn, increase of cost, as compared with the distance measuring apparatus of the first prior art (FIG. 22, FIG. 24). On the other hand, the distance measuring apparatus of the third prior art (FIG. 26) can be constructed in the smaller circuit scale, but does not allow simultaneous detection of both the signals I1 and I2 from the PSD 170 and thus requires double time for obtaining the distance L at the S/N ratio equivalent to that in the distance measuring apparatus of the second prior art (FIG. 25).

The above distance measuring devices of the prior arts all are designed to operate in good order when the reflectance of the object (subject) for the infrared light outputted from IRED is a standard value. When the reflectance of the object is low, the PSD outputs small values of the signals I1 and I2 and the apparatus can fail to obtain an accurate distance value. This problem appears significant, particularly, when the distance to the object is large. This will be described using the calculation results shown in FIG. 27 to FIG. 30.

FIG. 27 is a graph showing a relation between the distance and the distance signal obtained by the distance measuring apparatus of the first prior art when the reflectance of the object is the standard value, 36%. FIG. 28 is a graph showing a relation between the distance and the distance signal obtained by the distance measuring apparatus of the first prior art when the reflectance of the object is as low as 9%. FIG. 29 is a graph showing a relation between the distance and the distance signal obtained by the distance measuring apparatus of the second and third prior arts when the reflectance of the object is the standard value, 36%. FIG. 30 is a graph showing a relation between the distance and the distance signal obtained by the distance measuring apparatus of the second and third prior arts when the reflectance of the object is as low as 9%. In these figures, two dashed lines parallel to each other indicate the tolerance of measurement error.

In the distance measuring apparatus of the first prior art (FIG. 24), when the reflectance of the object is the standard value of 36%, as shown in FIG. 27, the distance signal always falls within the tolerance of measurement error, but the distance signal barely falls within the tolerance at some distances. On the other hand, when the reflectance of the object is as low as 9%, as shown in FIG. 28, the distance signal is off the tolerance of measurement error at certain distances. In the case of the distance measuring apparatus of the second and third prior arts, when the reflectance of the object is the standard value of 36%, as shown in FIG. 29, the distance signal is always within the tolerance of measurement error and this is an improvement as compared with the one shown in FIG. 24. On the other hand, when the reflectance of the object is as low as 9%, as shown in FIG. 30, the distance signal is off the tolerance of measurement error at certain distances, and this is similar to that shown in FIG. 28.

As described above, when the reflectance of the object is low, the distance signal can be off the tolerance of measurement error, depending upon the distance, so that the distance measurement (ranging) accuracy can become degraded. In order to solve this problem, it is thus conceivable to provide the clamping circuit for outputting the clamp signal Ic when the far signal I2 outputted from the second signal processing circuit 120 is smaller than the clamp signal Ic, between the second signal processor 120 and the arithmetic circuit 132 and set the level of this clamp signal Ic to a small value, in the distance measuring apparatus of the first prior art (FIG. 24).

FIG. 31 is a graph showing a relation between the distance and the distance signal obtained by the distance measuring apparatus of the first prior art when the level of the clamp signal Ic is set to a small value and when the reflectance of the object is the standard value of 36%. FIG. 32 is a graph showing a relation between the distance and the distance signal obtained by the distance measuring apparatus of the first prior art when the level of the clamp signal Ic is set to a small value and when the reflectance of the object is as low as 9%. As shown in FIG. 31, when the level of the clamp signal Ic is low and when the reflectance of the object is the standard value, the distance signal always falls within the tolerance of measurement error and, in addition, this is an improvement from that shown in FIG. 27. On the other hand, when the level of the clamp signal Ic is low and when the reflectance of the object is low, as shown in FIG. 32, the distance signal barely drops within the tolerance at some distances, while the distance signal is always within the tolerance of measurement error.

However, even if the level of the clamp signal Ic is set to the small value, when the luminance of the ambient light is relatively high, another problem will arise as follows. FIG. 33 is a graph showing a relation between the distance and the distance signal obtained by the distance measuring apparatus of the first prior art when the level of the clamp signal Ic is low, when the luminance of the ambient light is high, and when the reflectance of the object is the standard value of 36%. FIG. 34 is a graph showing a relation between the distance and the distance signal obtained by the distance measuring apparatus of the first prior art when the level of the clamp signal Ic is low, when the luminance of the ambient light is high, and when the reflectance of the object is as low as 9%. As shown in these figures, when the ambient light luminance is high, the tolerance of measurement error becomes wider, but, in spite thereof, when the reflectance of the object is not only the standard value but also lower than it, the distance signal can be off the tolerance of measurement error, depending upon the distance, so that the ranging accuracy can become degraded. The reason is that at high luminance of the ambient light the first signal processor 118 and the second signal processor 120 can fail to remove the stationary light fully, so as to cause measurement errors.

In order to solve the above problem, it is conceivable to increase the quantity of the light projected from the IRED or to increase the diameters of the projection lens and the receiving lens. FIG. 35 is a graph showing a relation between the distance and the distance signal obtained by the distance measuring apparatus of the first prior art when the quantity of the light projected from the IRED is four times larger and when the reflectance of the object is the standard value of 36%. FIG. 36 is a graph showing a relation between the distance and the distance signal obtained by the distance measuring apparatus of the first prior art when the quantity of the light projected from the IRED is four times larger and when the reflectance of the object is as low as 9%. As shown in these figures, when the reflectance of the object is not only the standard value but also smaller than the standard value, the distance signal is always within the tolerance of measurement error. However, the increase in the quantity of the light projected from the IRED will result in increasing the cost, while the increase in the diameters of the projection lens and the receiving lens will result in increasing the size.

SUMMARY OF THE INVENTION

Therefore, the present invention has been accomplished in order to solve the above problem and an object of the invention is to provide distance measuring apparatus that can determine the distance with accuracy even under such circumstances that the reflectance of the object is low and that the distance to the object is large, and that can be constructed without increase in cost and size.

[1] A first aspect of the distance measuring apparatus according to the present invention is a distance measuring apparatus comprising:

light projecting means for projecting light toward an object to be measured;

light receiving means for receiving reflected light of said light projected toward the object, at a reception position on a position sensitive device according to a distance to said object, and for outputting a far signal, which is a value increasing with increase in said distance if quantity of received light is constant, and a near signal, which is a value increasing with decrease in said distance if the quantity of received light is constant;

clamping means for accepting said far signal and comparing the far signal with a level of a clamp signal, wherein said clamping means outputs said far signal if a level of said far signal is not less than the level of said clamp signal, or outputs said clamp signal otherwise;

arithmetic means for calculating a ratio of said near signal and a signal outputted from said clamping means to output an output ratio signal;

integrating means for cumulatively integrating said output ratio signal and outputting an integral signal according to a result of integration; and control means for controlling each of projection of said light in said light projecting means, the level of said clamp signal in said clamping means, and the total sum of integral time of said output ratio signal in said integrating means, and for detecting a distance value, based on said integral signal outputted from said integrating means, wherein said control means works as follows:

(a) the control means sets said clamp signal to a first level, and the control means detects a first distance value, based on said integral signal outputted from said integrating means while the total sum of integral time of said output ratio signal in said integrating means is set to a first number;

(b) when said first distance value is a value farther than a first set distance, the control means sets said clamp signal to a second level smaller than said first level, and the control means detects a second distance value, based on said integral signal outputted from said integrating means while the total sum of integral time of said output ratio signal in said integrating means is set to a second number;

(c) when said second distance value is a value nearer than a second set distance, or, when said second distance value is not a value nearer than the second set distance and when a difference of said second distance value from said first distance value is smaller than a first set value, the control means sets said clamp signal to said first level, the control means detects a third distance value, based on said integral signal outputted from said integrating means while the total sum of integral time of said output ratio signal in said integrating means is set to a third number, and the control means calculates the distance to said object, based on the sum of said first distance value and said third distance value;

(d) when said second distance value is not a value nearer than the second set distance and when the difference of said second distance value from said first distance value is not smaller than the first set value, the control means sets said clamp signal to said second level, the control means detects the third distance value, based on said integral signal outputted from said integrating means while the total sum of integral time of said output ratio signal in said integrating means is set to the third number, and the control means calculates the distance to the object, based on the sum of said second distance value and said third distance value.

The first number, the second number, and the third number may be equal to each other or different from each other.

According to the first aspect, even if the second distance value is detected as a near-side value under the conditions of the ambient light luminance being relatively high and the object having a large reflectance, when the second distance value is a value nearer than the second set distance, the third distance value is detected with the clamp signal being set at the first level of the high level and the distance to the object is calculated based on the sum of the first distance value and the third distance value. Therefore, the distance to the object can be detected with accuracy.

[2] A second aspect of the distance measuring apparatus according to the present invention is a distance measuring apparatus comprising:

light projecting means for projecting light toward an object to be measured;

light receiving means for receiving reflected light of said light projected toward the object, at a reception position on a position sensitive device according to a distance to said object, and for outputting a far signal, which is a value increasing with increase in said distance if quantity of received light is constant, and a near signal, which is a value increasing with decrease in said distance if the quantity of received light is constant;

clamping means for accepting said far signal and comparing the far signal with a level of a clamp signal, wherein said clamping means outputs said far signal if a level of said far signal is not less than the level of said clamp signal, or outputs said clamp signal otherwise;

arithmetic means for calculating a ratio of said near signal and a signal outputted from said clamping means to output an output ratio signal;

integrating means for cumulatively integrating said output ratio signal and outputting an integral signal according to a result of integration; and control means for controlling each of projection of said light in said light projecting means, the level of said clamp signal in said clamping means, and the total sum of integral time of said output ratio signal in said integrating means, and for detecting a distance value, based on said integral signal outputted from said integrating means, wherein said control means works as follows:
(a) the control means sets said clamp signal to a first level, and
the control means detects a first distance value, based on said integral signal outputted from said integrating means while the total sum of integral time of said output ratio signal in said integrating means is set to a first number;
(b) when said first distance value is a value farther than a first set distance, the control means sets said clamp signal to a second level smaller than said first level, and
the control means detects a second distance value, based on said integral signal outputted from said integrating means while the total sum of integral time of said output ratio signal in said integrating means is set to a second number;
(c) when a difference of said second distance value from said first distance value is smaller than a first set value, or, when the difference of said second distance value from said first distance value is not smaller than the first set value and when said second distance value is a value farther than a third set distance,
the control means sets said clamp signal to said first level,
the control means detects a third distance value, based on said integral signal outputted from said integrating means while the total sum of integral time of said output ratio signal in said integrating means is set to a third number, and
the control means calculates the distance to said object, based on the sum of said first distance value and said third distance value;
(d) when the difference of said second distance value from said first distance value is not smaller than the first set value and when said second distance value is not a value farther than the third set distance,
the control means sets said clamp signal to said second level,
the control means detects the third distance value, based on said integral signal outputted from said integrating means while the total sum of integral time of said output ratio signal in said integrating means is set to the third number, and
the control means calculates the distance to the object, based on the sum of said second distance value and said third distance value.

The first number, the second number, and the third number may be equal to or different from each other.

According to the second aspect, even if the difference of the second distance value from the first distance value is not smaller than the first set value, when the second distance value is a value farther than the third set distance, the third distance value is detected with the clamp signal being set at the first level and the distance to the object is calculated based on the sum of the first distance value and the third distance value. In this structure, when the reflectance of the object is close to the reference reflectance, the third distance value is detected with the clamp signal being set at the first level whereby the third distance value is prevented from being detected as a value nearer than a designed value. For this reason, the distance to the object can be detected with accuracy.

[3] A third aspect of the distance measuring apparatus according to the present invention is a distance measuring apparatus comprising:
light projecting means for projecting light toward an object to be measured;
light receiving means for receiving reflected light of said light projected toward the object, at a reception position on a position sensitive device according to a distance to said object, and for outputting a far signal, which is a value increasing with increase in said distance if quantity of received light is constant, and a near signal, which is a value increasing with decrease in said distance if the quantity of received light is constant;
clamping means for accepting said far signal and comparing the far signal with a level of a clamp signal, wherein said clamping means outputs said far signal if a level of said far signal is not less than the level of said clamp signal, or outputs said clamp signal otherwise;
arithmetic means for calculating a ratio of said near signal and a signal outputted from said clamping means to output an output ratio signal;
integrating means for cumulatively integrating said output ratio signal and outputting an integral signal according to a result of integration; and
control means for controlling each of projection of said light in said light projecting means, the level of said clamp signal in said clamping means, and the total sum of integral time of said output ratio signal in said integrating means, and for detecting a distance value, based on said integral signal outputted from said integrating means, wherein said control means works as follows:
(a) the control means sets said clamp signal to a first level, and
the control means detects a first distance value, based on said integral signal outputted from said integrating means while the total sum of integral time of said output ratio signal in said integrating means is set to a first number;
(b) when said first distance value is a value farther than a first set distance, the control means sets said clamp signal to a second level smaller than said first level, and
the control means detects a second distance value, based on said integral signal outputted from said integrating means while the total sum of integral time of said output ratio signal in said integrating means is set to a second number;
(c) either when the sum of said first distance value and said first distance value is not larger than a second set value or when a difference of said second distance value from said first distance value is not larger than a third set value and when the difference of said second distance value from said first distance value is smaller than a first set value,
the control means sets said clamp signal to said first level,
the control means detects a third distance value, based on said integral signal outputted from said integrating means while the total sum of integral time of said output ratio signal in said integrating means is set to a third number, and
the control means calculates the distance to said object, based on the sum of said first distance value and said third distance value;
(d) when the sum of said first distance value and said first distance value is larger than the second set value and when the difference of said second distance value from said first distance value is larger than the third set value, or, either when the sum of said first distance value and said first distance value is not larger than the second set value or when the difference of said second distance value from said first distance value is not larger than the third set value and when the difference of said second distance value from said first distance value is not smaller than the first set value, the control means sets said clamp signal to said second level, the control means detects the third distance value, based on said integral signal outputted from said integrating means while the total sum of integral time of said output ratio signal in said integrating means is set to the third number, and the control means calculates the distance to the object, based on the sum of said second distance value and said third distance value.

The first number, the second number, and the third number may be equal to or different from each other.

According to this configurations, when the sum of the first distance value and the first distance value or the like is larger than the second set value and when the difference of the second distance value from the first distance value is larger than the third set value, the third distance value is detected with the clamp signal being set at the second level and the distance to the object is calculated based on the sum of the second distance value and the third distance value. In this structure, when the object has a low reflectance, the third distance value is detected with the clamp signal being set at the first level, which reduces a possibility of detecting the third distance value as a value farther than a designed value. For this reason, the distance to the object can be detected with accuracy.

[4] A fourth aspect of the distance measuring apparatus according to the present invention is a distance measuring apparatus comprising:

light projecting means for projecting light toward an object to be measured;

light receiving means for receiving reflected light of said light projected toward the object, at a reception position on a position sensitive device according to a distance to said object, and for outputting a far signal, which is a value increasing with increase in said distance if quantity of received light is constant, and a near signal, which is a value increasing with decrease in said distance if the quantity of received light is constant;

clamping means for accepting said far signal and comparing the far signal with a level of a clamp signal, wherein said clamping means outputs said far signal if a level of said far signal is not less than the level of said clamp signal, or outputs said clamp signal otherwise;

arithmetic means for calculating a ratio of said near signal and a signal outputted from said clamping means to output an output ratio signal;

integrating means for cumulatively integrating said output ratio signal and outputting an integral signal according to a result of integration; and control means for controlling each of projection of said light in said light projecting means, the level of said clamp signal in said clamping means, and the total sum of integral time of said output ratio signal in said integrating means, and for detecting a distance value, based on said integral signal outputted from said integrating means, wherein said control means works as follows:

(a) the control means sets said clamp signal to the first level, and the control means detects the first distance value, based on said integral signal outputted from said integrating means while the total sum of integral time of said output ratio signal in said integrating means is set to the first number;

(b) when said first distance value is a value farther than the first set distance, the control means sets said clamp signal to the second level smaller than said first level, and the control means detects the second distance value, based on said integral signal outputted from said integrating means while the total sum of integral time of said output ratio signal in said integrating means is set to the second number;

(c) either when the sum of said first distance value and said second distance value is not larger than the second set value or when the difference of said second distance value from said first distance value is not larger than the third set value and when the difference of said second distance value from said first distance value is smaller than the first set value, the control means sets said clamp signal to said first level, the control means detects the third distance value, based on said integral signal outputted from said integrating means while the total sum of integral time of said output ratio signal in said integrating means is set to the third number, and the control means calculates the distance to said object, based on the sum of said first distance value and said third distance value;

(d) when the sum of said first distance value and said second distance value is larger than the second set value and when the difference of said second distance value from said first distance value is larger than the third set value, or, either when the sum of said first distance value and said second distance value is not larger than the second set value or when the difference of said second distance value from said first distance value is not larger than the third set value and when the difference of said second distance value from said first distance value is not smaller than the first set value, the control means sets said clamp signal to said second level, the control means detects the third distance value, based on said integral signal outputted from said integrating means while the total sum of integral time of said output ratio signal in said integrating means is set to the third number, and the control means calculates the distance to the object, based on the sum of said second distance value and said third distance value.

The first number, the second number, and the third number may be equal to or different from each other.

According to this configurations, when the sum of the first distance value and the first distance value or the like is larger than the second set value and when the difference of the second distance value from the first distance value is larger than the third set value, the third distance value is detected with the clamp signal being set at the second level and the distance to the object is calculated based on the sum of the second distance value and the third distance value. In this structure, when the object has a low reflectance, the third distance value is detected with the clamp signal being set at the first level, which reduces a possibility of detecting the third distance value as a value farther than a designed value. For this reason, the distance to the object can be detected with accuracy.

[5] A fifth aspect of the distance measuring apparatus according to the present invention is a distance measuring apparatus comprising:

light projecting means for projecting light toward an object to be measured;

light receiving means for receiving reflected light of said light projected toward the object, at a reception position on a position sensitive device according to a distance to said object, and for outputting a far signal, which is a value increasing with increase in said distance if quantity of received light is constant, and a near signal, which is a value increasing with decrease in said distance if the quantity of received light is constant;

clamping means for accepting said far signal and comparing the far signal with a level of a clamp signal, wherein said clamping means outputs said far signal if a level of said far signal is not less than the level of said clamp signal, or outputs said clamp signal otherwise;

arithmetic means for calculating a ratio of said near signal and a signal outputted from said clamping means to output an output ratio signal;

integrating means for cumulatively integrating said output ratio signal and outputting an integral signal according to a result of integration; and control means for controlling each of projection of said light in said light projecting means, the level of said clamp signal in said clamping means, and the total sum of integral time of said output ratio signal in said integrating means, and for detecting a distance value, based on said integral signal outputted from said integrating means, wherein said control means works as follows:

(a) the control means sets said clamp signal to the first level, and the control means detects the first distance value, based on said integral signal outputted from said integrating means while the total sum of integral time of said output ratio signal in said integrating means is set to the first number;

(b) when said first distance value is a value farther than the first set distance, the control means sets said clamp signal to the second level smaller than said first level, and the control means detects the second distance value, based on said integral signal outputted from said integrating means while the total sum of integral time of said output ratio signal in said integrating means is set to the second number;

(c) either when the sum of said second distance value and said second distance value is not larger than the second set value or when the difference of said second distance value from said first distance value is not larger than the third set value and when the difference of said second distance value from said first distance value is smaller than the first set value, the control means sets said clamp signal to said first level, the control means detects the third distance value, based on said integral signal outputted from said integrating means while the total sum of integral time of said output ratio signal in said integrating means is set to the third number, and the control means calculates the distance to said object, based on the sum of said first distance value and said third distance value;

(d) when the sum of said second distance value and said second distance value is larger than the second set value and when the difference of said second distance value from said first distance value is larger than the third set value, or, either when the sum of said second distance value and said second distance value is not larger than the second set value or when the difference of said second distance value from said first distance value is not larger than the third set value and when the difference of said second distance value from said first distance value is not smaller than the first set value, the control means sets said clamp signal to said second level, the control means detects the third distance value, based on said integral signal outputted from said integrating means while the total sum of integral time of said output ratio signal in said integrating means is set to the third number, and the control means calculates the distance to the object, based on the sum of said second distance value and said third distance value.

The first number, the second number, and the third number may be equal to or different from each other.

According to this configurations, when the sum of the first distance value and the first distance value or the like is larger than the second set value and when the difference of the second distance value from the first distance value is larger than the third set value, the third distance value is detected with the clamp signal being set at the second level and the distance to the object is calculated based on the sum of the second distance value and the third distance value. In this structure, when the object has a low reflectance, the third distance value is detected with the clamp signal being set at the first level, which reduces a possibility of detecting the third distance value as a value farther than a designed value. For this reason, the distance to the object can be detected with accuracy.

[6] A sixth aspect of the distance measuring apparatus according to the present invention is a distance measuring apparatus comprising:

light projecting means for projecting light toward an object to be measured;

light receiving means for receiving reflected light of said light projected toward the object, at a reception position on a position sensitive device according to a distance to said object, and for outputting a far signal, which is a value increasing with increase in said distance if quantity of received light is constant, and a near signal, which is a value increasing with decrease in said distance if quantity of received light is constant;

clamping means for accepting said far signal and comparing the far signal with a level of a clamp signal, wherein said clamping means outputs said far signal if a level of said far signal is not less than the level of said clamp signal, or outputs said clamp signal otherwise;

arithmetic means for calculating a ratio of said near signal and a signal outputted from said clamping means to output an output ratio signal;

integrating means for cumulatively integrating said output ratio signal in an integrating capacitor and outputting an integral signal according to a result of integration; and control means for controlling each of projection of said light in said light projecting means, the level of said clamp signal in said clamping means, and the total sum of integral time of said output ratio signal in said integrating means, and for detecting a distance value, based on said integral signal outputted from said integrating means, wherein said control means works as follows:
(a) the control means sets said clamp signal to a first level, and
the control means detects a first distance value, based on said integral signal outputted from said integrating means while the total sum of integral time of said output ratio signal in said integrating means is set to a first number;
(b) the control means sets said clamp signal to a second level, and
the control means detects a second distance value, based on said integral signal outputted from said integrating means while the total sum of integral time of said output ratio signal in said integrating means is set to a second number smaller than said first number;
(c) the control means corrects said second distance value by adding a predetermined value to said second distance value, and
the control means calculates the distance to said object, based on the sum of said first distance value and said corrected second distance value.

A further aspect of this apparatus is preferably the apparatus wherein said second level of said clamp signal in detection of said second distance value is equal to or smaller than said first level of said clamp signal in detection of said first distance value.

[7] A seventh aspect of the distance measuring apparatus according to the present invention is a distance measuring apparatus comprising:

light projecting means for projecting light toward an object to be measured;

light receiving means for receiving reflected light of said light projected toward the object, at a reception position on a position sensitive device according to a distance to said object, and for outputting a far signal, which is a value increasing with increase in said distance if quantity of received light is constant, and a near signal, which is a value increasing with decrease in said distance if the quantity of received light is constant;

clamping means for accepting said far signal and comparing the far signal with a level of a clamp signal, wherein said clamping means outputs said far signal if a level of said far signal is not less than the level of said clamp signal, or outputs said clamp signal otherwise;

arithmetic means for calculating a ratio of said near signal and a signal outputted from said clamping means to output an output ratio signal;

integrating means for cumulatively integrating said output ratio signal in an integrating capacitor and outputting an integral signal according to a result of integration; and control means for controlling each of projection of said light in said light projecting means, the level of said clamp signal in said clamping means, and the total sum of integral time of said output ratio signal in said integrating means, and for detecting a distance value, based on said integral signal outputted from said integrating means, wherein said control means works as follows:
(a) the control means sets said clamp signal to a first level, and
the control means detects a first distance value, based on said integral signal outputted from said integrating means while the total sum of integral time of said output ratio signal in said integrating means is set to a first number;
(b) the control means sets said clamp signal to a second level, and
the control means detects a second distance value, based on said integral signal outputted from said integrating means while the total sum of integral time of said output ratio signal in said integrating means is set to a second number smaller than said first number;
(c) the control means corrects said second distance value by adding a predetermined value to said second distance value;
(d) the control means sets said clamp signal to a third level, and
the control means detects a third distance value, based on said integral signal outputted from said integrating means while the total sum of integral time of said output ratio signal in said integrating means is set to a third number smaller than said first number;
(e) the control means corrects said third distance value by adding a predetermined value to said third distance value;
(f) the control means calculates the distance to said object, based on the sum of said first distance value and said corrected second distance value or based on the sum of said second distance value and said corrected third distance value.

In this case, the second number and the third number are desirably equal to each other.

A further aspect of this apparatus is preferably the apparatus wherein said second level of said clamp signal in detection of said second distance value is equal to or smaller than said first level of said clamp signal in detection of said first distance value, and wherein said third level of said clamp signal in detection of said third distance value is equal to or smaller than said first level of said clamp signal in detection of said first distance value.

A further aspect of this apparatus is preferably the apparatus wherein said predetermined value added for correction of said second distance value is equal to said predetermined value added for correction of said third distance value.

According to these configurations, when continuous distance measurement is carried out to detect the distance to the object, based on a plurality of distance values, there occurs change in characteristics of the integrating capacitor between the integral processing for detection of the first distance value and in the integral processing for detection of the second distance value. However, variation of the second distance value due to the change in the characteristics of the integrating capacitor can be corrected in such a way that the total sum of integral time in the detection of the first distance value is made different from that in the detection of the second distance value and that correction is made by adding a predetermined value to the second distance value. For this reason, the distance to the object can be detected with accuracy.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 7 is a flowchart showing the operation of the distance measuring apparatus according to the first embodiment.

DESCRIPTION OF THE PREFERRED EMBODIMENTS

The embodiments of the present invention will be described hereinafter in detail with reference to the accompanying drawings. Throughout the description of the drawings the same elements will be denoted by the same reference symbols and redundant description will be omitted. The embodiments below will be described as examples of application in which the active distance measuring apparatus is applied to the distance measuring apparatus of an autofocusing camera.

First Embodiment

Figure 1:
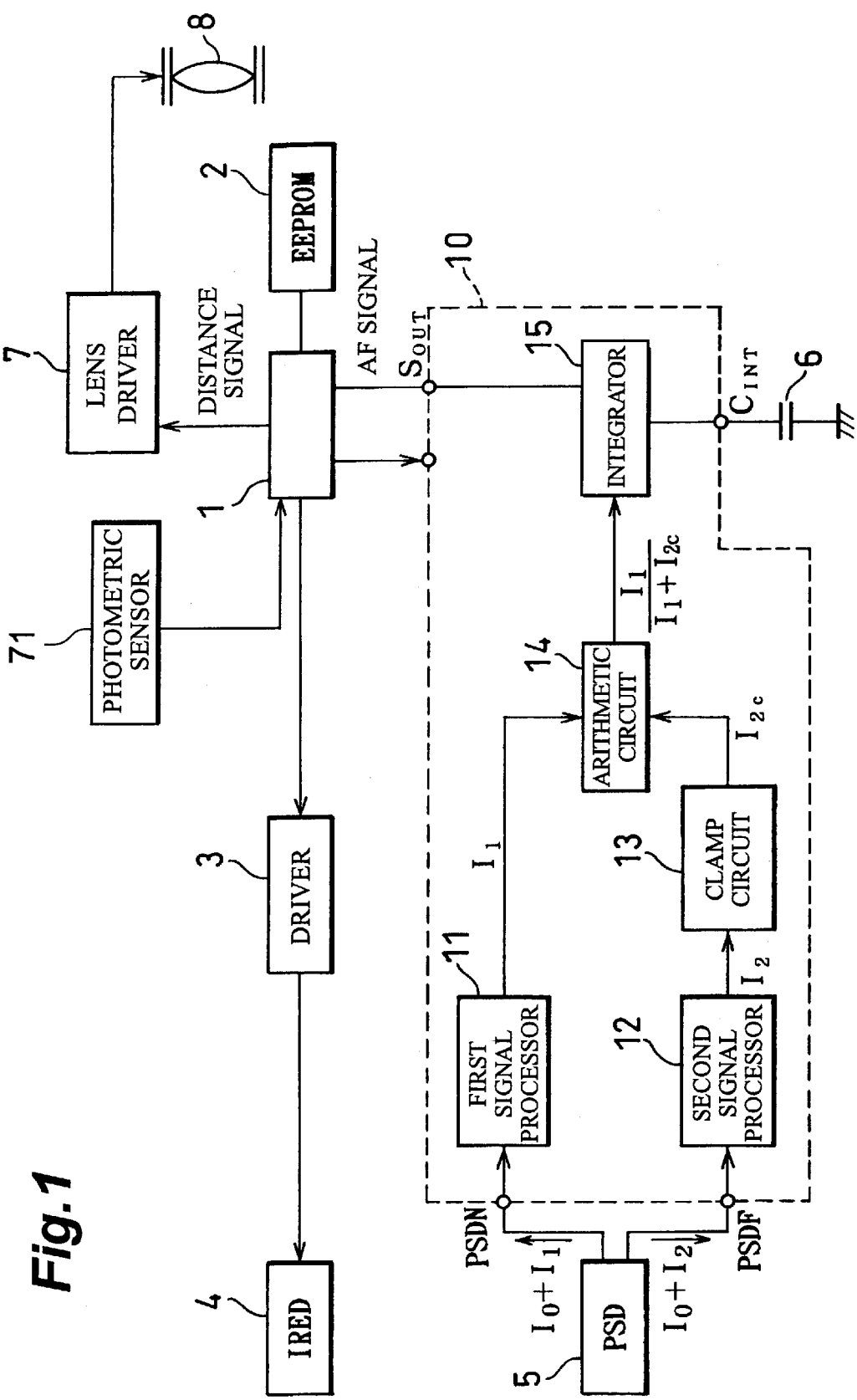
FIG. 1 is a block diagram of the distance measuring apparatus according to the first embodiment.

First, the overall structure of the distance measuring apparatus according to the present embodiment will be described. FIG. 1 is a block diagram of the distance measuring apparatus according to the present embodiment.

CPU 1 controls the entire camera equipped with this distance measuring apparatus and controls the entire camera including this distance measuring apparatus, based on programs and parameters preliminarily stored in EEPROM 2. In the distance measuring apparatus shown in this figure, the CPU 1 controls a driver 3 to control emission of infrared light from IRED (infrared emitting diode) 4. The CPU 1 also controls t he action of autofucusing IC (referred to hereinafter as "AFIC") 10 and accepts the AF signal outputted from the AFIC 10. Further, the CPU 1 accepts a value of the ambient light luminance measured by a photometric sensor 71.

Particularly, the CPU 1 of the present embodiment is characterized by provision of a control section 1A. This control section 1A controls the level of the clamp signal in the clamping circuit 13 and the summation of integral time of the output ratio signal in the integrating circuit 15 and detects a measured distance value, based on the integral signal outputted from the integrating circuit 15. Then the control section 1A executes various comparison, arithmetic, control, and other operations, based on this measured distance value, to determine an accurate distance value.

The infrared light emitted from the IRED 4 is projected through a projection lens (not shown) placed in front of the IRED 4, toward an object to be measured and is reflected in part thereby. Then the reflected light travels through a receiving lens (not shown) placed in front of the PSD (position sensitive device) 5, to be received at some position on the photoreceptive surface of PSD 5. This received position varies according to the distance to the object. Then the PSD 5 outputs two signals I1 and I2 according to the received position. The signal I1 is a near signal indicating a value increasing with decrease of the distance under the condition of constant quantity of received light, while the signal I2 a far signal indicating a value increasing with increase in the distance under the condition of constant quantity of received light. The sum of the signals I1 and I2 represents the quantity of the reflected light received by the PSD 5, and the output ratio (I1/(I1+I2)) the received position on the photoreceptive surface of the PSD 5 or the distance to the object. The near signal I1 is supplied to a PSDN terminal of AFIC 10 and the far signal I2 to a PSDF terminal of AFIC 10. It is, however, noted that in practice the AFIC 10 may receive signals in which the stationary light component I0 is added to the near signal I1 and to the far signal I2, depending upon outside conditions.

The AFIC 10 is an integrated circuit (IC) and is composed of a first signal processing circuit 11, a second signal processing circuit 12, a clamping circuit 13, an arithmetic circuit 14, and an integrating circuit 15. The first signal processing circuit 11 is a circuit receiving the signal I1+I0 outputted from the PSD 5, removing the stationary light component I0 included in the signal, and outputting the near signal I1, and the second signal processing circuit 12 a circuit receiving the signal I2+I0 outputted from the PSD 5, removing the stationary light component I0 included in the signal, and outputting the far signal I2.

The clamping circuit 13 accepts the far signal I2 outputted from the second signal processing circuit 12, compares the far signal I2 with the clamp signal Ic of a certain fixed level, and outputs the clamp signal Ic when the clamp signal is larger, or outputs the far signal I2 otherwise as it is. In the following, the signal outputted from this clamping circuit 13 is denoted by I2c.

The arithmetic circuit 14 accepts the near signal I1 outputted from the first signal processing circuit 11 and the signal I2c (the larger out of the far signal I2 and the clamp signal Ic) outputted from the clamping circuit 13, performs the operation of the output ratio (I1/(I1+I2c)), and outputs the output ratio signal indicating the result of the operation. The integrating circuit 15 accepts the output ratio signal and integrates the output ratio multiple times in cooperation with an integrating capacitor 6 connected to a CINT terminal of the AFIC 10, thereby improving the S/N ratio. In particular, it is important that the number of integral operations at large distances to the object be set larger than the number of integral operations at small distances, thereby improving the S/N ratio. Then the integrated output ratio is outputted as an AF signal from an SOUT terminal of the AFIC 10. The CPU 1 accepts the AF signal outputted from the AFIC 10, performs a predetermined operation to transform the AF signal to a distance signal, and sends the distance signal to a lens driving circuit 7. The lens driving circuit 7 performs an autofocusing operation of a taking lens 8, based on the distance signal.

Figure 2:
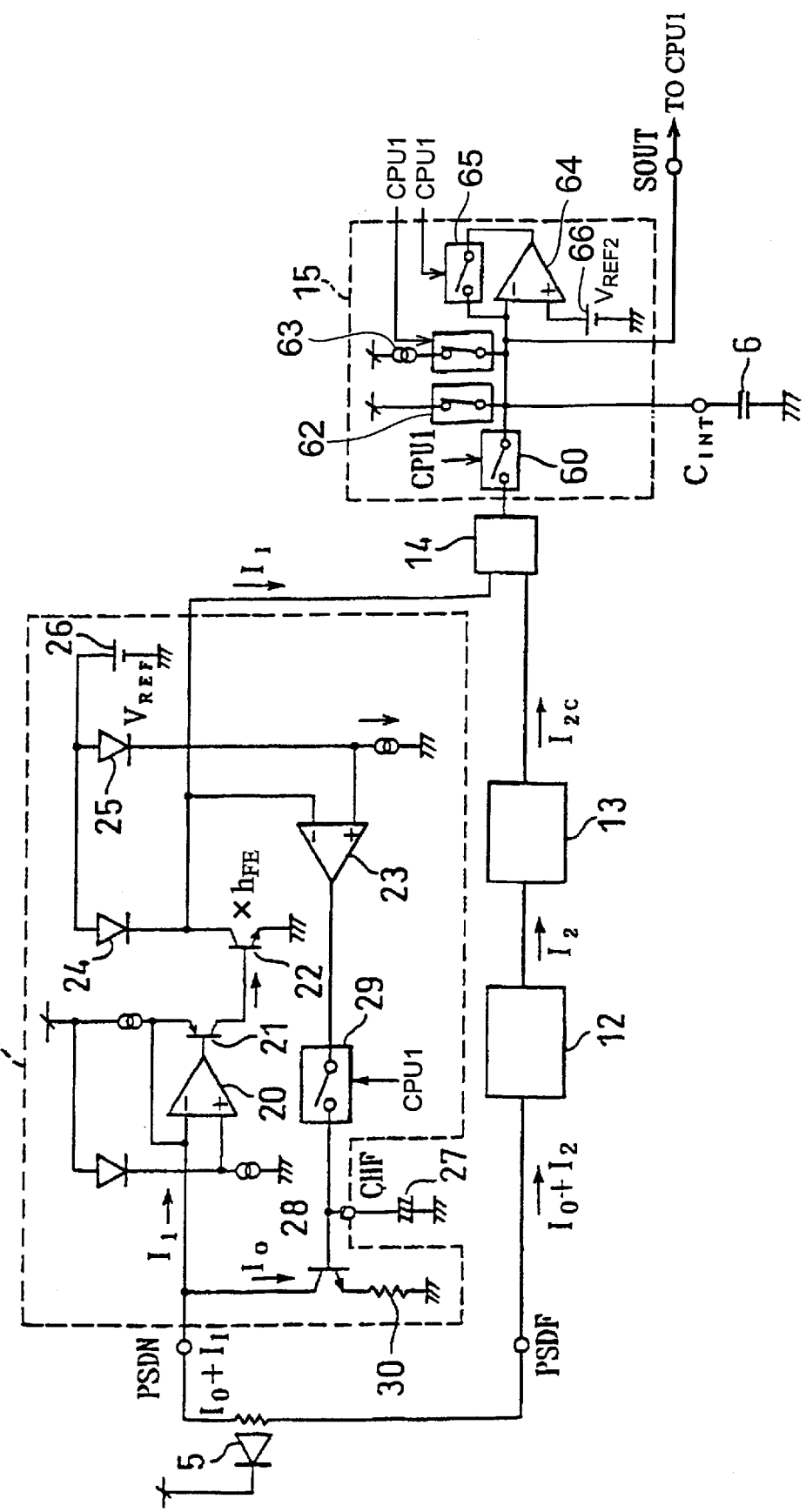
FIG. 2 is a circuit diagram of the first signal processing circuit and integrating circuit in the distance measuring apparatus according to the first embodiment.
Figure 3:
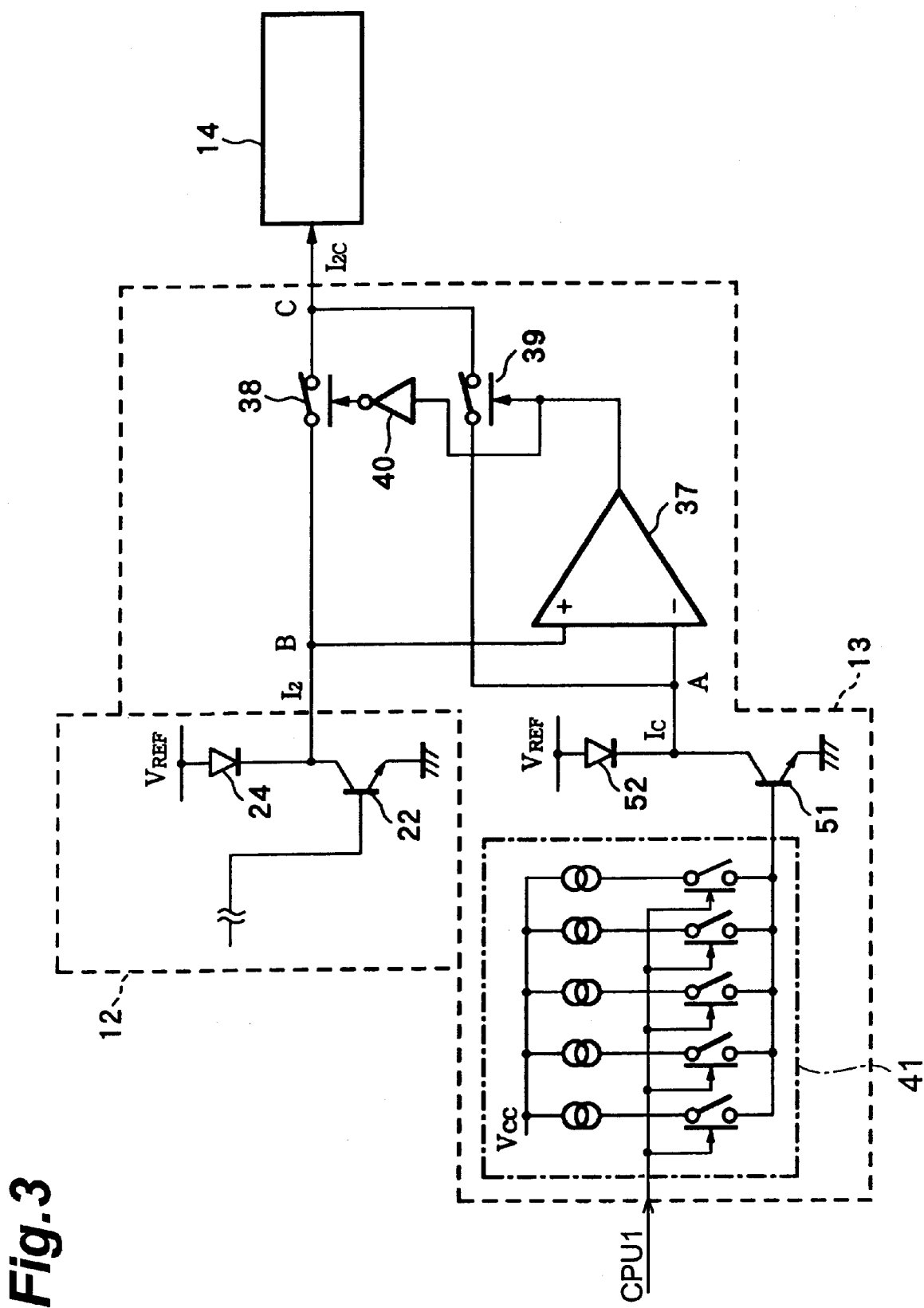
FIG. 3 is a circuit diagram of the clamping circuit in the distance measuring apparatus according to the first embodiment.

Described next are more specific circuit configurations of the first signal processing circuit 11, clamping circuit 13, and integrating circuit 15 in the AFIC 10. FIG. 2 is a circuit diagram of the first signal processing circuit 11 and the integrating circuit 15 in the distance measuring apparatus of the present embodiment. FIG. 3 is a circuit diagram of the clamping circuit 13 in the distance measuring apparatus of the present embodiment. The second signal processing circuit 12 also has a circuit configuration similar to that of the first signal processing circuit 11.

The first signal processing circuit 11 is configured, as in the circuit diagram illustrated in FIG. 2, to accept the near signal I1 plus the stationary light component I0 outputted from the PSD 5, remove the stationary light component I0 therefrom, and output the near signal I1. An electric current (I1+I0) outputted from a near distance terminal of the PSD 5 is inputted through the PSDN terminal of the AFIC 10 into a negative input terminal of an operational amplifier 20 of the first signal processing circuit 11. An output terminal of the operational amplifier 20 is connected to a base terminal of transistor 21 and a collector terminal of the transistor 21 is coupled to a base terminal of transistor 22. A collector terminal of the transistor 22 is connected to a negative input terminal of operational amplifier 23 and also to the arithmetic circuit 14. Further, a cathode terminal of compressing diode 24 is connected to the collector terminal of the transistor 22, a cathode terminal of compressing diode 25 to a positive input terminal of the operational amplifier 23, and a first reference power supply 26 to anode terminals of the respective compressing diodes 24 and 25.

An external, stationary light removing capacitor 27 is connected to a CHF terminal of the AFIC 10, and this stationary light removing capacitor 27 is coupled to a base terminal of a stationary light removing transistor 28 in the first signal processing circuit 11. The stationary light removing capacitor 27 and the operational amplifier 23 are connected through a switch 29 to each other and the CPU 1 controls on/off of this switch 29. A collector terminal of the stationary light removing transistor 28 is connected to the negative input terminal of the operational amplifier 20 and an emitter terminal of the transistor 28 is grounded through a resistor 30.

The clamping circuit 13 is configured as in the circuit diagram shown in FIG. 3. A positive input terminal of a determination comparator 37 in the clamping circuit 13 is connected to the collector terminal of the transistor 22 of the second signal processing circuit 12 and through a switch 38 to an input terminal of the arithmetic circuit 14. On the other hand, a negative input terminal of the determination comparator 37 is connected to a collector terminal of a transistor 51 and to a cathode terminal of a compressing diode 52 in fashion similar to the transistor 22 and the compressing diode 24 connected to the positive input terminal, and through a switch 39 to the input terminal of the arithmetic circuit 14.

A clamp current source 41 is connected to a base terminal of the transistor 51. This clamp current source 41 is a current source in which plural sets of constant current sources and switches, each set consisting of a constant current source and a switch connected in series, are connected in parallel, and each of the switches is controlled to be switched on or off by the CPU 1. The clamp current source 41 supplies a clamp current as the sum of electric currents from constant current sources corresponding to closed switches, to the base terminal of the transistor 51. This clamp current serves as a base current of the transistor 51 and a collector potential according to the magnitude of the base current is given to the negative input terminal of the determination comparator 37.

An output terminal of the determination comparator 37 is coupled to the switch 39, and an output signal from the determination comparator 37 is provided to the switch. The output terminal of the determination comparator 37 is connected through an inverter 40 to the switch 38, so that the output signal from the determination comparator 37 is once inverted and then supplied to the switch 38. Accordingly, the switches 38 and 39 are in such a relation that one is switched on while the other off by the output signal from the determination comparator 37.

The integrating circuit 15 is constructed as in the circuit configuration shown in FIG. 2. The external integrating capacitor 6 connected to the CINT terminal of the AFIC 10 is connected through a switch 60 to the output terminal of the arithmetic circuit 14, is connected through a switch 62 to a constant current source 63, is connected through a switch 65 to an output terminal of an operational amplifier 64, and is connected directly to a negative input terminal of the operational amplifier 64, and a potential of the capacitor 6 is outputted from an SOUT terminal of the AFIC 10. These switches 60, 62, and 65 are controlled by a control signal from the CPU 1. A second reference power supply 66 is connected to a positive input terminal of the operational amplifier 64.

The action of the AFIC 10 constructed as described above will be described in brief with reference to FIG. 2 and FIG. 3. The CPU 1 turns the switch 29 of the first signal processing circuit 11 on while the IRED 4 emits no light. The stationary light component I0 outputted at this time from the PSD 5 is supplied into the first signal processing circuit 11, is amplified in current by the current amplifier comprised of the operational amplifier 20 and the transistors 21 and 22, and is logarithmically compressed to be converted into a voltage signal by the compressing diode 24, and this voltage signal is supplied to the negative input terminal of the operational amplifier 23. When the signal entering the operational amplifier 20 is large, the cathode potential of the compressing diode 24 becomes high, so that the operational amplifier 23 outputs a large signal. Therefore, the capacitor 27 is charged up. Then the base current is supplied to the transistor 28 and the collector current flows in the transistor 28. Then the signal entering the operational amplifier 20 becomes smaller among the signal I0 entering the first signal processing circuit 11. In a stable operation state of this closed loop, all the signal I0 entering the first signal processing circuit 11 flows to the transistor 28, so that a charge corresponding to the base current at that time is stored in the capacitor 27.

When the CPU 1 switches the switch 29 off upon emission of light from the IRED 4, the stationary light component I0 out of the signal I1+I0 outputted from the PSD 5 at this time flows as a collector current to the transistor 28 to which a base potential is applied by the charge stored in the capacitor 27, and the near signal I1 is amplified in current by the current amplifier comprised of the operational amplifier 20 and the transistors 21 and 22 and logarithmically compressed to be converted into a voltage signal by the compressing diode 24 to be outputted. Namely, the first signal processing circuit 11 outputs only the near signal I1 after the removal of the stationary light component I0, and the near signal I1 is inputted into the arithmetic circuit 14. On the other hand, the second signal processing circuit 12 also outputs only the far signal I2 after the removal of the stationary light component I0, as the first signal processing circuit 11 does, and the far signal I2 is inputted into the clamping circuit 13.

The far signal I2 inputted into the clamping circuit 13 is supplied to the positive input terminal of the determination comparator 37 of the clamping circuit 13. The clamp current outputted from the clamp current source 41 flows as a base current of the transistor 51 and a potential (clamp signal Ic) appearing at the collector terminal of the transistor 51 upon the flow of the base current is inputted into the negative input terminal of the determination comparator 37. The far signal I2 and the clamp signal Ic are compared with each other by the determination comparator 37 and either one of the switches 38 and 39 is turned on while the other off, according to the result of the comparison. Namely, when the far signal I2 is larger than the clamp signal Ic, the switch 38 is switched on while the switch 39 off, and the far signal I2 is outputted as the output signal I2c of the clamping circuit 13. In the reverse case of the magnitude, the switch 38 is turned off while the switch 39 on, and the clamp signal Ic is outputted as the output signal I2c of the clamping circuit 13.

The signal I2c outputted from the clamping circuit 13 and the near signal I1 outputted from the first signal processing circuit 11 are supplied to the arithmetic circuit 14, and the arithmetic circuit 14 performs the operation of the output ratio (I1/(I1+I2c)) and supplies the output ratio to the integrating circuit 15. During a period of emission of the predetermined number of pulses from the IRED 4, the switch 60 of the integrating circuit 15 is kept on and the switches 62 and 65 off, so that the integrating capacitor 6 is discharged by an electric current equivalent to output ratios in the predetermined number of operations whereby the potential thereof is lowered from VREF2 (first integral). After completion of the emission of the predetermined number of pulses, the switch 60 is switched off and the switch 62 on, and the potential of the integrating capacitor 6 lowered by the first integral operation is increased by the constant current supplied from the constant current source 63 (second integral operation). The CPU 1 monitors the potential of the integrating capacitor 6, measures a time necessary for restoring the original potential, obtains the AF signal, based on the time, and determines the distance to the object.

Figure 4:
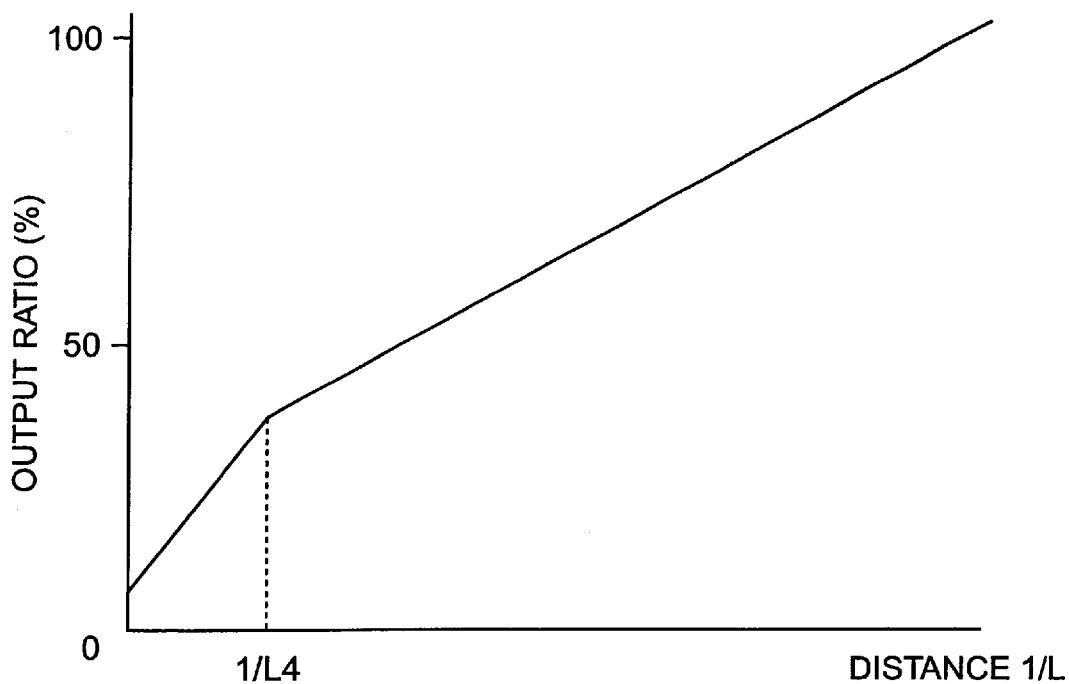
FIG. 4 is a drawing showing a relation between the distance to the object and the AF signal outputted from the integrating circuit in the distance measuring apparatus according to the first embodiment.

A relation between the distance L to the object and the AF signal obtained in this way is presented in FIG. 4. FIG. 4 is a drawing showing the relation between the distance to the object and the AF signal outputted from the integrating circuit of the distance measuring apparatus according to the present embodiment. In the graph shown in this figure, the abscissa represents the inverse (1/L) of the distance L to the object, and the ordinate the output ratio (I1/(I1+I2)) or the AF signal. As shown in this figure, in the range in which the distance L to the object is not more than the distance L4 (L≦L4), the signal outputted from the clamping circuit 13 is I2, and the output ratio is I1/(I1+I2), is substantially in a linear relation to the inverse (1/L) of the distance L, and decreases with increase in the distance L (or with decrease in 1/L). In the range in which the distance L is not less than the distance L4 (L≧L4), the signal outputted from the clamping circuit 13 is Ic, and the output ratio is I1/(I1+Ic) and also decreases with increase in the distance L in this case. With use of the clamping circuit 13, the distance L to the object can be uniquely and stably determined from the output ratio (AF signal) in this way.

Figure 5:
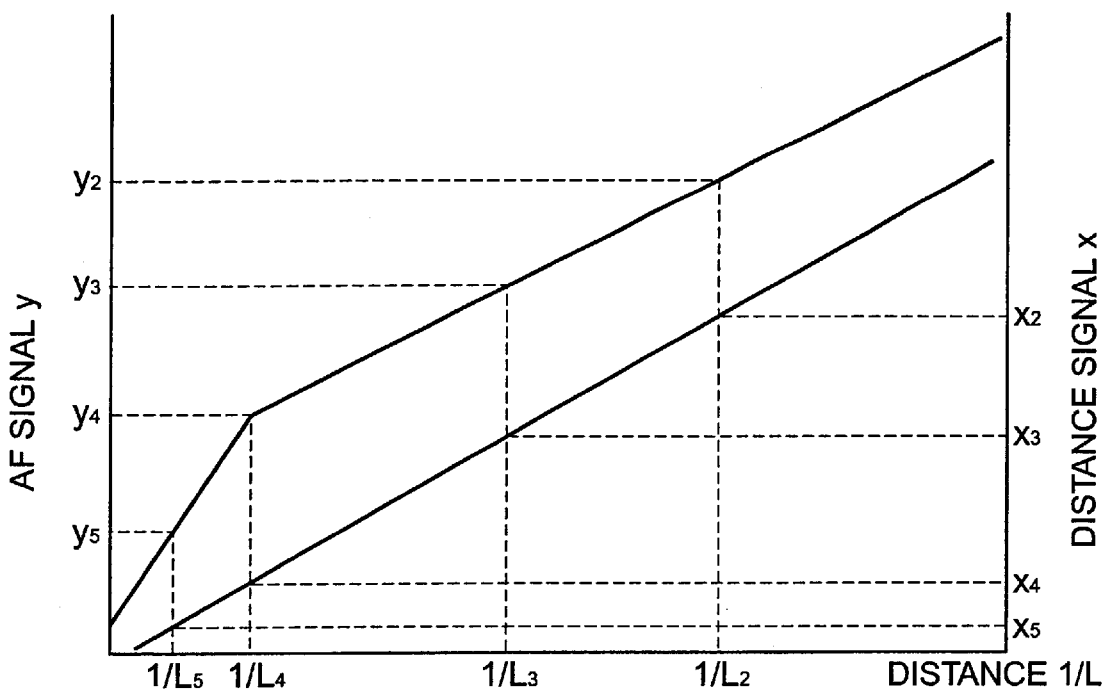
FIG. 5 is an explanatory diagram for explaining transformation from the AF signal to the distance signal in the distance measuring apparatus according to the first embodiment.

The CPU 1 performs an operation to calculate a distance signal indicating a feed length of the taking lens 8, based on the AF signal obtained in this way, and sends the distance signal to the lens driving circuit 7 to bring the taking lens 8 into focus. FIG. 5 is a drawing for explaining the transformation from the AF signal to the distance signal in the distance measuring apparatus according to the present embodiment. In the graph shown in this figure, the abscissa represents the inverse (1/L) of the distance L to the object, the left ordinate the AF signal, and the right ordinate the distance signal. This graph shows each of the relation between the distance L and the AF signal and the relation between the distance L and the distance signal and, particularly, shows that against distances L2, L3, L4, and L5 (where L2<L3<L4<L5), AF signals are y2, y3, y4, and y5 and distance signals are x2, x3, x4, and x5, respectively.

In each of the range of the distance L≦L4 and the range of the distance L>L4, the AF signal is substantially in a linear relation to the inverse (1/L) of the distance L and in the entire range of the distance L the distance signal is substantially in a linear relation to the inverse (1/L) of the distance L. In each of the range of the distance L<L4 and the range of the distance L≧L4, the AF signal and the distance signal are also substantially in a linear relation.

Accordingly, the AF signal y can be transformed to the distance signal x, using transformation formulas expressed by equations of the first degree. Namely, the distance signal can be obtained by a transformation formula represented by Eq. (1) below in the range in which the AF signal y is over the clamp effect presence/absence criterion level (i.e., in the range where the distance L is less than L4).

$$x = A2 \cdot y + B2 \tag{1}$$

In this equation, parameters A2, B2 are given by Eqs (2), Eq (3) below.

$$A2 = (x3-x2)/(y3-y2) \tag{2}$$

$$B2 = x2 - y2 \cdot A2 \tag{3}$$

On the other hand, the distance signal is obtained by a transformation formula given by Eq (4) below, in the range in which the AF signal y is not more than the clamp effect presence/absence criterion level (i.e., in the range where the distance L is not less than L4).

$$x = A3 \cdot y + B3 \tag{4}$$

In this equation, parameters A3, B3 are given by Eqs (5), (6) below.

$$A3 = (x5-x4)/(y5-y4) \tag{5}$$

$$B3 = x4 - y4 \, A3 \tag{6}$$

Here Eq (1) and Eq (4) are the transformation formulas different from each other. Further, when the AF signal y is not more than the farthest AF signal value INFDATA corresponding to the farthest set value of the taking lens 8, the distance signal x is set to the farthest distance signal value AFINF corresponding to the farthest set value of the taking lens 8, which permits stabler focusing control of the taking lens.

The parameters A2, B2, A3, and B3, the farthest AF signal value INFDATA, and the farthest distance signal value AFINF are determined upon manufacturing every camera incorporating this distance measuring apparatus and are preliminarily stored in EEPROM 2 or the like. Then these parameters are read by the CPU 1 upon distance measurement and are used in the operation of Eq (1) or Eq (4) to transform the AF signal y to the distance signal x.

Figure 6A:
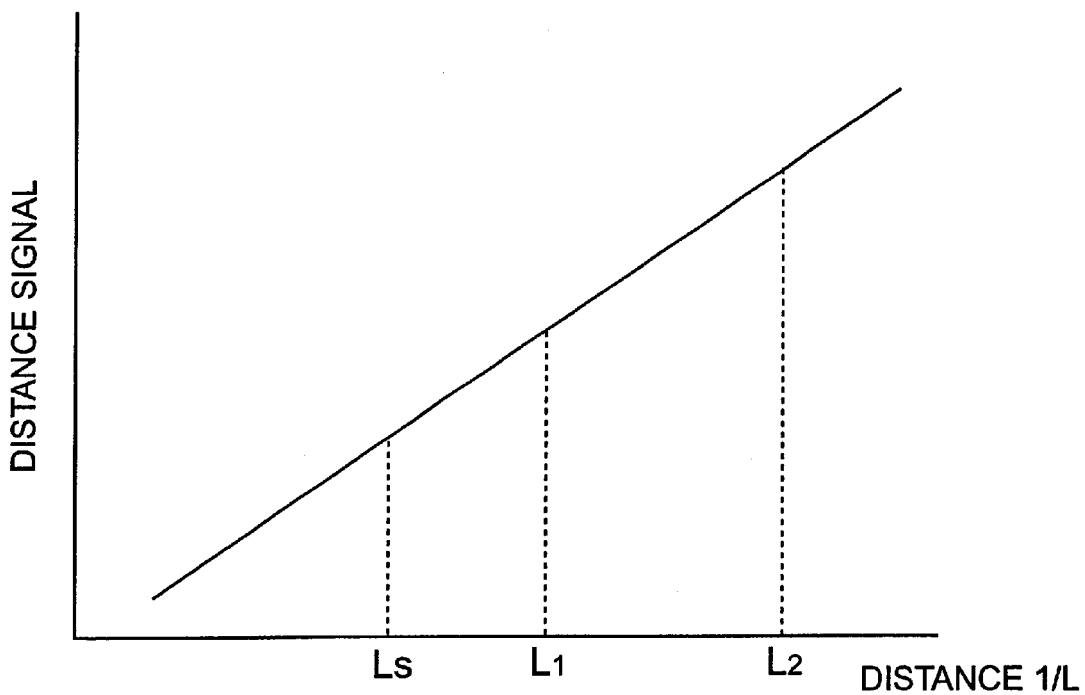
FIG. 6A is a drawing for explaining a relation between the distance signal and the distance to the object.
Figure 6B:
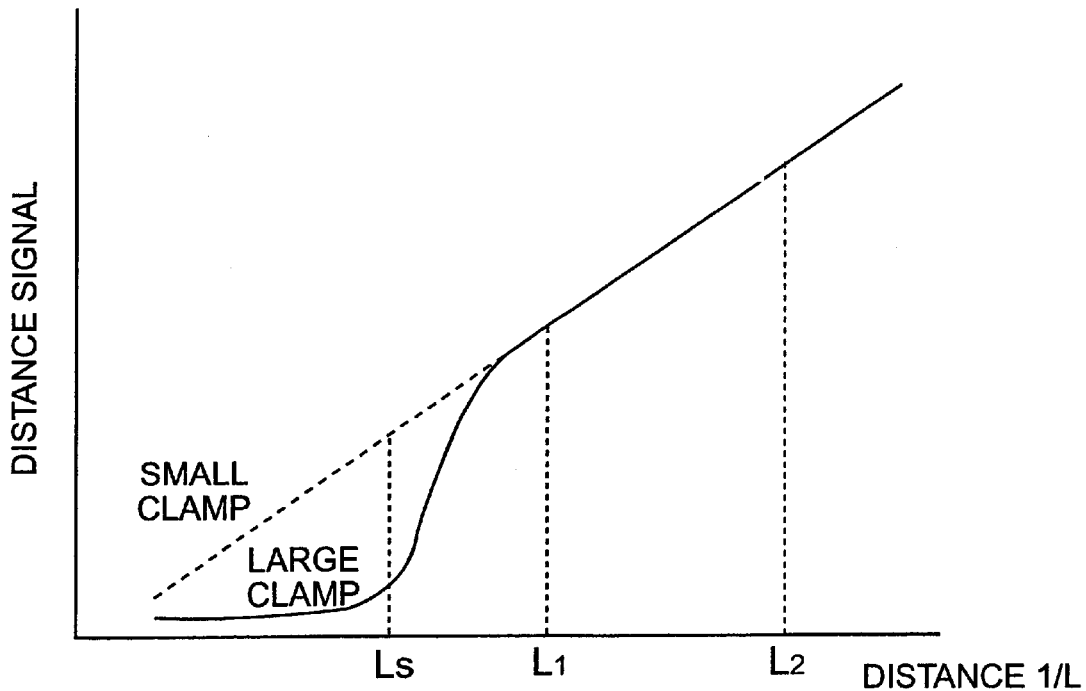
FIG. 6B is a drawing for explaining relations between the distance signal and the distance to the object.

In cases where the reflectance of the object is low and the distance to the object is large, however, the PSD 5 outputs small values of the signals I1 and I2 and the distance tends to be judged as infinity. FIGS. 6A and 6B are drawings for explaining the relations between the distance to the object and the distance signal. FIG. 6A shows the relation where the reflectance of the object is the standard value of 36% and FIG. 6B the relation where the reflectance of the object is as low as 9%. As shown in FIG. 6A, when the reflectance of the object is the standard value of 36%, the distance signal provides values substantially proportional to the inverse (1/L) of the distance L to the object. However, when the reflectance of the object is as low as 9%, as shown in FIG. 6B, the distance signal provides values substantially proportional to the inverse (1/L) in the range where the distance L to the object is small, but in the range where the distance L is large (e.g., at a distance Ls in the figure), the distance signal is not proportional to the inverse (1/L) and is also off the tolerance of measurement error.

Even in such cases where the reflectance of the object is low, it is feasible to obtain the distance signal providing values substantially proportional to the inverse (1/L) of the distance L to the object, or the distance signal providing values within the tolerance of measurement error, by setting the clamp signal Ic in the clamping circuit 13 to a small value. The distance measuring apparatus of the present embodiment is constructed by making use of the above to determine the distance to the object with accuracy even in the cases where the reflectance of the object is low and the distance to the object is large.

The operation of the distance measuring apparatus according to the present embodiment will be described below.

Figure 8:
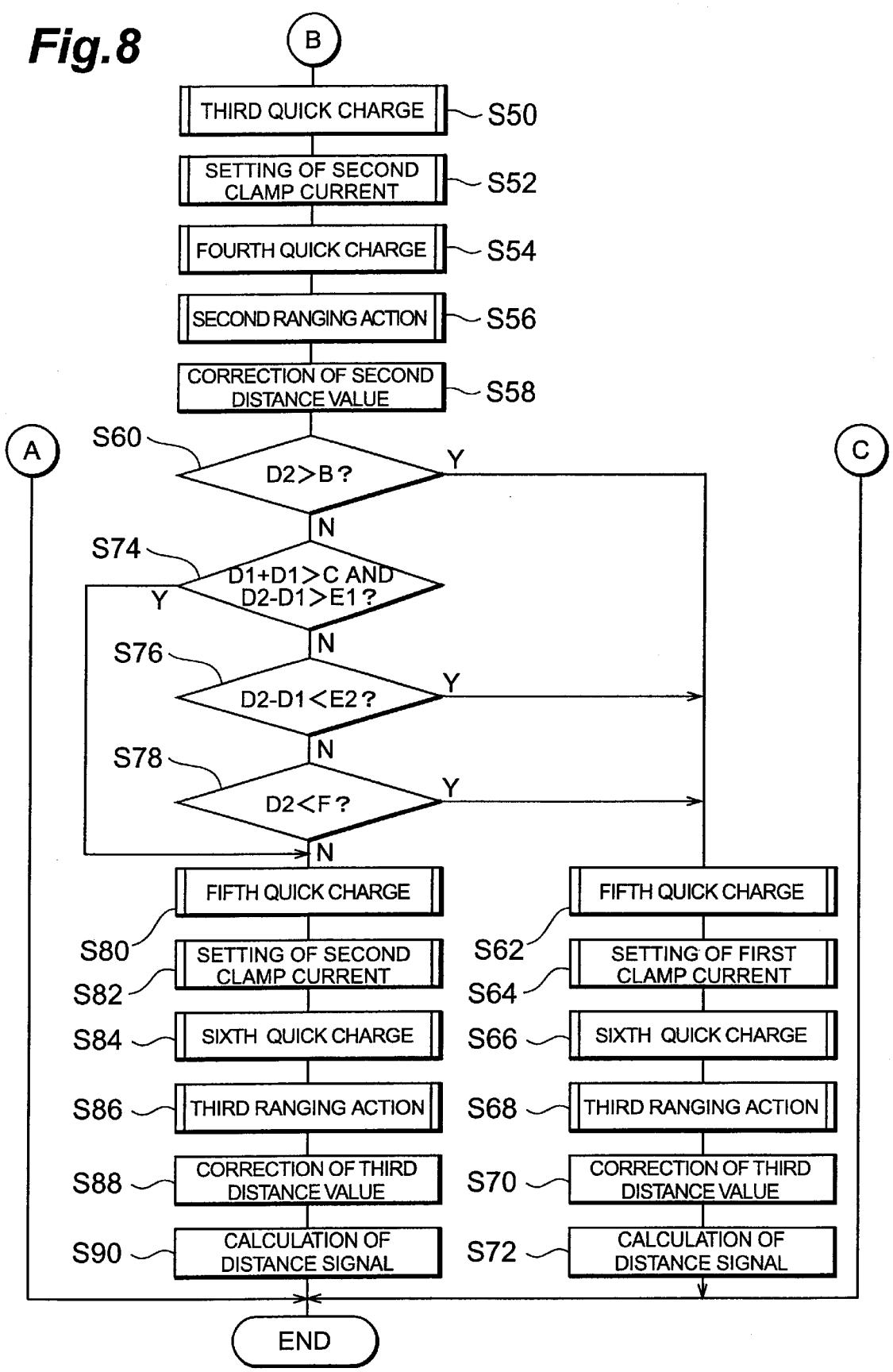
FIG. 8 is a flowchart showing the operation of the distance measuring apparatus according to the first embodiment.
Figure 9:
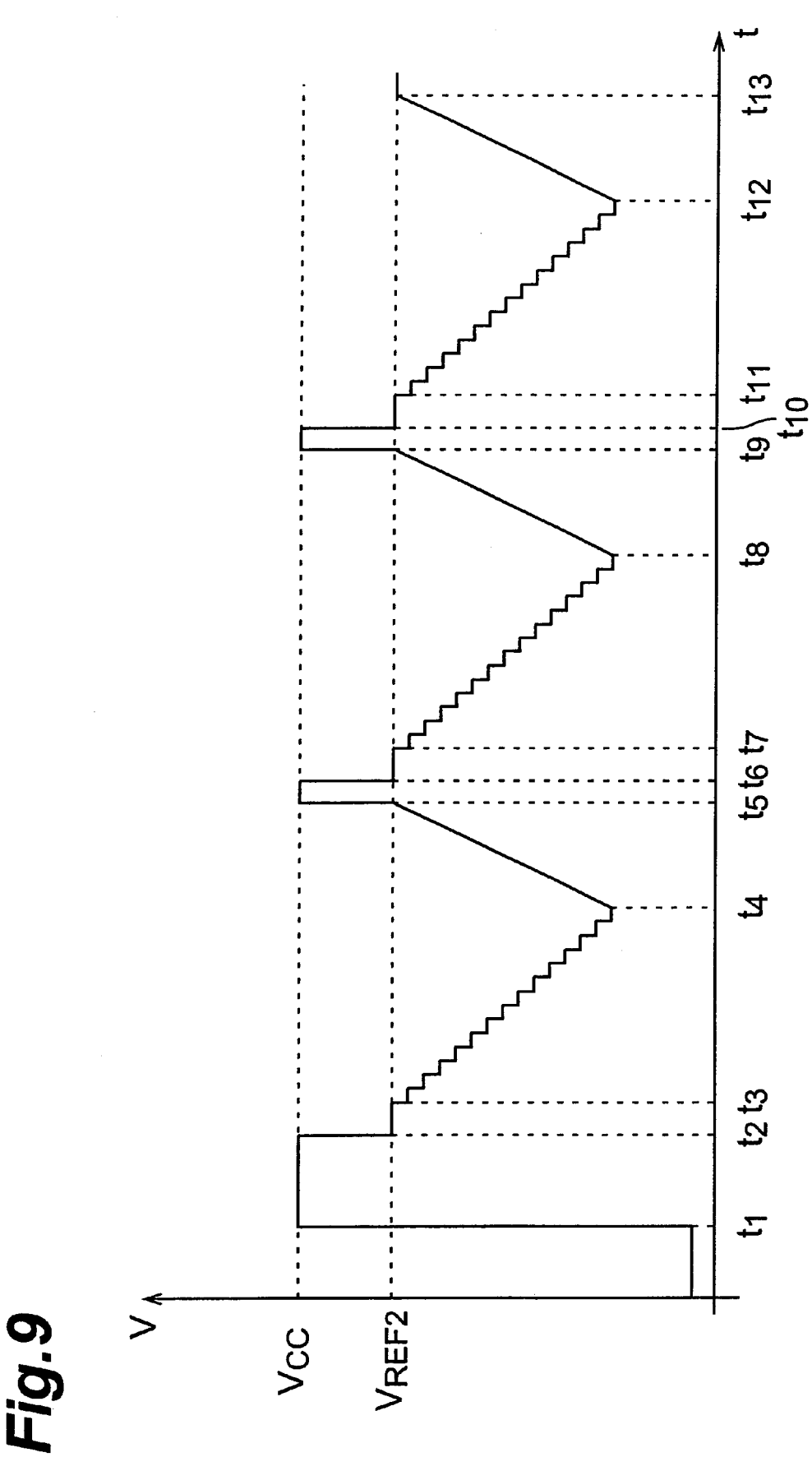
FIG. 9 is a timing chart in the operation of the distance measuring apparatus according to the first embodiment.

FIGS. 7 and 8 present the flowchart of AF ranging processing in the distance measuring apparatus according to the present embodiment. FIG. 9 is a drawing showing the charging voltage to the integrating capacitor in the AF ranging processing of the distance measuring apparatus according to the present embodiment. The operation described below is carried out under control of the CPU 1.

The AF ranging processing of the distance measuring apparatus according to the present embodiment is initiated when the release button (not shown) of the camera is depressed into a half stroke. A first quick charge is first carried out as shown in S10 of FIG. 7. The first quick charge is carried out by applying the power-supply voltage Vcc to the integrating capacitor 6 through the integrating circuit 15 according to a control signal from the CPU 1 (t1–t2 in FIG. 9).

Then the flow transfers to S12 to set a first clamp current. The setting of the first clamp current is carried out in such a manner that the CPU 1 outputs a control signal to select a clamp current to be outputted from the clamp circuit 13. This first clamp current is set, for example, at 1 nA.

Then the flow moves to S14 to carry out a second quick charge. The second quick charge is carried out in such a manner that the voltage VREF2 is applied through the integrating circuit 15 to the integrating capacitor 6 according to a control signal outputted from the CPU 1 (t2–t2 in FIG. 9).

Then the flow moves to S16 to carry out a first ranging action. The first ranging action is a process of activating the IRED 4 to emit the predetermined number of pulses, receiving the reflected light from the object by the PSD 5, carrying out a first integral operation (t3–t4 in FIG. 9) for discharging a voltage according to the distance to the object, thereafter carrying out a second integral operation (t4–t5 in FIG. 9), and calculating a first distance value D1 according to the summation of integral time of the second integral operation. In this first ranging action, for example, 166 emissions and integrations are carried out. The first distance value D1, and a second distance value D2 and a third distance value D3 described hereinafter, are values decreasing with increase in the distance from the object.

Then the flow goes to S18 to perform a luminance determination. The luminance determination is a process of reading the value of the ambient light luminance measured by the photometric sensor 71 and determining whether the luminance value measured is smaller than a preset value. When it is determined in S18 that the luminance value of the ambient light is not less than the preset value, the flow goes to S20.

In S20 a third quick charge is carried out. The third quick charge is carried out in such a manner, similar to the first quick charge, that the power-supply voltage Vcc is applied through the integrating circuit 15 to the integrating capacitor 6 according to a control signal outputted from the CPU 1 (t5–t6 in FIG. 9).

Then the flow moves to S22 to set a first clamp current. The setting of the first clamp current is carried out in a manner similar to S12. Then the flow goes to S24 to carry out a fourth quick charge. The fourth quick charge is carried out in such a manner, similar to the second quick charge, that the voltage VREF2 is applied through the integrating circuit 15 to the integrating capacitor 6 according to a control signal from the CPU 1 (t6–t7 in FIG. 9).

Then the flow transfers to S26 to carry out a second ranging action. The second ranging action is a process of activating the IRED 4 to emit the predetermined number of pulses, receiving the reflected light from the object by the PSD 5, carrying out a first integral operation (t7–t8 in FIG. 9) for discharging a voltage according to the distance to the object, thereafter carrying out a second integral operation (t8–t9 in FIG. 9), and calculating a second distance value D2 according to the summation of integral time of the second integral operation. In the second ranging action, the number of emissions from the IRED 4 and integrations in the integrating capacitor 6 is smaller than that in the first ranging action. For example, 164 emissions and integrations are carried out in the second ranging action.

Then the flow goes to S28 to perform a correction process for the second distance value D2. This correction operation is carried out by adding a predetermined value to the second distance value D2 calculated in S26 and defining the calculation result as the second distance value D2. The predetermined value herein is set, for example, in the range of −15 to +40 counts, where the second distance value D2 is 1000 counts corresponding to the distance of 3.5 m and where the second distance value D2 is 1900 counts corresponding to the distance of 0.8 m, respectively.

Then the flow goes to S30 to perform an operation to calculate the distance signal, based on the first distance value D1 and the second distance value D2. Namely, the sum of the first distance value D1 and the second distance value D2 is defined as the AF signal y and the distance signal x is calculated according to foregoing Eq. (1) or Eq. (4). After the calculation of the distance signal, the AF ranging processing is then terminated.

Meanwhile, when it is determined in S18 that the luminance value of the ambient light is smaller than the preset value, the flow goes to S32 to determine whether the first distance value D1 calculated in the first ranging action is not more than a preset value Al. When it is determined in S32 that the first distance value D1 is more than the set value A1, the flow moves to S34 to determine whether the first distance value D1 is larger than a preset value A2.

When it is determined in S34 that the first distance value D1 is larger than the set value A2, the flow goes to S36 to perform an operation to calculate the distance signal, based on the first distance value D1. Namely, the double of the first distance value D1 is defined as the AF signal y and the distance signal x is calculated according to foregoing Eq (1) or Eq (4). After the calculation of the distance signal, the AF ranging processing is then terminated.

When it is determined in S34 on the other hand that the first distance value D1 is not more than the set value A2, the flow goes to S38 to perform a third quick charge. The third quick charge is carried out in such a manner, similar to the first quick charge, that the power-supply voltage Vcc is applied through the integrating circuit 15 to the integrating capacitor 6 according to a control signal from the CPU 1 (t5–t6 in FIG. 9).

Then the flow goes to S40 to set a first clamp current. The setting of the first clamp current is carried out in a manner similar to S12. Then the flow goes to S42 to carry out a fourth quick charge. The fourth quick charge is carried out in such a manner, similar to the second quick charge, that the voltage VREF2 is applied through the integrating circuit 15 to the integrating capacitor 6 according to a control signal from the CPU 1 (t6–t7 in FIG. 9).

Then the flow goes to S44 to perform a second ranging action. The second ranging action is a process similar to S26 to activate the IRED 4 to emit the predetermined number of pulses, receive the reflected light from the object by the PSD 5, carry out a first integral operation (t7–t8 in FIG. 9) for discharging a voltage according to the distance to the object, thereafter carry out a second integral operation (t8–t9 in FIG. 9), and calculate a second distance value D2 according to the summation of integral time of the second integral operation.

Then the flow moves to S46 to carry out a correction process for the second distance value D2. This correction process is carried out by adding a predetermined value to the second distance value D2 calculated in S44 and defining the result as the second distance value D2. The predetermined value herein is set, for example, in the range of −15 to +40 counts, where the second distance value D2 is 1000 counts corresponding to the distance of 3.5 m and where the second distance value D2 is 1900 counts corresponding to the distance of 0.8 m, respectively.

Then the flow goes to S48 to perform an operation to calculate the distance signal, based on the first distance value D1 and the second distance value D2. Namely, the sum of the first distance value D1 and the second distance value D2 is defined as the AF signal y, and the distance signal x is calculated according to foregoing Eq. (1) or Eq. (4). After the calculation of the distance signal, the AF ranging processing is then terminated.

Meanwhile, when it is determined in S32 that the first distance value D1 is not more than the set value A1, the distance to the object is judged far and the flow goes to S50. In S50 a third quick charge is carried out. The third quick charge is carried out in such a manner, similar to the first quick charge, that the power-supply voltage Vcc is applied through the integrating circuit 15 to the integrating capacitor 6 according to a control signal from the CPU 1 (t5–t6 in FIG. 9).

Then the flow moves to S52 to set a second clamp current. The setting of the second clamp current is carried out in such a manner that the CPU 1 outputs a control signal to select a clamp current to be outputted from the clamping circuit 13. This second clamp current is set to a current smaller than the first clamp current and is set, for example at 0.5 nA.

Then the flow proceeds to S54 to carry out a fourth quick charge. The fourth quick charge is performed in such a manner, similar to the second quick charge, that the voltage VREF2 is applied through the integrating circuit 15 to the integrating capacitor 6 according to a control signal from the CPU 1 (t6–t7 in FIG. 9).

Then the flow transfers to S56 to carry out a second ranging action. The second ranging action is a process similar to S26, to activate the IRED 4 to emit the predetermined number of pulses, receive the reflected light from the object by the PSD 5, execute a first integral operation (t7–t8 in FIG. 9) for discharging a voltage according to the distance to the object, execute a second integral operation (t8–t9 in FIG. 9), and calculate a second distance value D2 according to the summation of integral time of the second integral operation.

Then the flow proceeds to S58 to perform a correction process for the second distance value D2. This correction process is carried out by adding a predetermined value to the second distance value D2 calculated in S56 and defining the result as the second distance value D2. The predetermined value herein is set, for example, in the range of −15 to +40 counts, where the second distance value D2 is 1000 counts corresponding to the distance of 3.5 m and where the second distance value D2 is 1900 counts corresponding to the distance of 0.8 m, respectively.

Then the flow proceeds to S60 to determine whether the second distance value D2 is larger than a preset value B. When it is determined that the second distance value D2 is larger than the set value B, the flow goes to S62 to perform a fifth quick charge. The fifth quick charge is carried out in such a manner, similar to the third quick charge, that the power-supply voltage Vcc is applied through the integrating circuit 15 to the integrating capacitor 6 according to a control signal from CPU 1 (t9–t10 in FIG. 9).

Then the flow goes to S64 to set a first clamp current. The setting of the first clamp current is carried out in a manner similar to S12. Then the flow moves to S66 to carry out a sixth quick charge. The sixth quick charge is performed in such a manner, similar to the fourth quick charge, that the voltage VREF2 is applied through the integrating circuit 15 to the integrating capacitor 6 according to a control signal from the CPU 1 (t10–t11 in FIG. 9).

Then the flow goes to S68 to perform a third ranging action. The third ranging action is carried out in a manner similar to the second ranging action in S56 and is configured to activate the IRED 4 to emit the predetermined number of pulses, receive the reflected light from the object by the PSD 5, execute a first integral operation (t11–t12 in FIG. 9) for discharging a voltage according to the distance to the object, thereafter execute a second integral operation (t12–t13 in FIG. 9), and calculate a third distance value D3 according to the summation of integral time of the second integral operation. In this third ranging action, the number of emissions from the IRED 4 and integrations in the integrating capacitor 6 is smaller than that in the first ranging action. For example, 164 emissions and integrations are carried out in the third ranging action.

Then the flow goes to S70 to perform a correction process for the third distance value D3. This correction process is carried out by adding a predetermined value to the third distance value D3 calculated in S68 and defining the result as the third distance value D3. The predetermined value herein is set, for example, in the range of −15 to +40 counts, where the third distance value D3 is 1000 counts corresponding to the distance of 3.5 m and where the third distance value D3 is 1900 counts corresponding to the distance of 0.8 m, respectively Then the flow goes to S72 to perform an operation to calculate the distance signal, based on the first distance value D1 and the third distance value D3. Namely, the sum of the first distance value D1 and the third distance value D3 is defined as the AF signal y and the distance signal x is calculated according to foregoing Eq. (1) or Eq. (4). After the calculation of the distance signal, the AF ranging processing is then terminated.

Meanwhile, when it is determined in S60 that the second distance value D2 is not more than the set value B, the flow goes to S74. In S74, it is determined whether the sum (D1+D1) of the first distance value D1 and the first distance value D1 is larger than a preset value C and whether a difference (D2−D1) of the second distance value D2 from the first distance value D1 is larger than a preset value E1.

When it is determined in S74 that the sum (D1+D1) of the first distance value D1 and the first distance value D1 is larger than the set value C and that the difference (D2−D1) between the second distance value D2 and the first distance value D1 is larger than the set value E1, the flow jumps to S80.

On the other hand, when it is determined that the sum (D1+D1) of the first distance value D1 and the first distance value D1 is not more than the set value C or that the difference (D2−D1) between the second distance value D2 and the first distance value D1 is not more than the set value E1, the flow goes to S76. In S76 it is determined whether the difference (D2−D1) between the second distance value D2 and the first distance value D1 is smaller than a preset value E2. The set value E2 herein is set to a value larger than the set value E1.

When it is determined in this S76 that the difference (D2−D1) between the second distance value D2 and the first distance value D1 is smaller than the set value E2, the flow goes to S62. When it is determined in S76 on the other hand that the difference (D2–D1) between the second distance value D2 and the first distance value D1 is not smaller than the set value E2, the flow goes to S78.

It is determined in S78 whether the second distance value D2 is smaller than a preset value F. The set value F herein is set to a value smaller than the set value B. When it is determined in S78 that the second distance value D2 is smaller than the preset value F, the flow goes to S62. When it is determined in S78 on the other hand that the second distance value D2 is not smaller than the preset value F, the flow goes to S80.

In S80 a fifth quick charge is carried out. The fifth quick charge is carried out in such a manner, similar to the third quick charge, that the power-supply voltage Vcc is applied through the integrating circuit 15 to the integrating capacitor 6 according to a control signal from the CPU 1 (t9–t10 in FIG. 9).

Then the flow goes to S82 to set a second clamp current. The setting of the second clamp current is carried out in a manner similar to S52. Then the flow goes to S84 to perform a sixth quick charge. The sixth quick charge is carried out in such a manner, similar to the fourth quick charge, that the voltage VREF2 is applied through the integrating circuit 15 to the integrating capacitor 6 according to a control signal from the CPU 1 (t10–t11 in FIG. 9).

Then the flow moves to S86 to perform a third ranging action. The third ranging action is a process similar to the second ranging action in S56 and is configured to activate the IRED 4 to emit the predetermined number of pulses, receive the reflected light from the object by the PSD 5, carry out a first integral operation (t11–t12 in FIG. 9) for discharging a voltage according to the distance to the object, thereafter carry out a second integral operation (t12–t13 in FIG. 9), and calculate a third distance value D3 according to the summation of integral time of the second integral operation. In this third ranging action, the number of emissions from the IRED 4 and integrations in the integrating capacitor 6 is smaller than that in the first ranging action. For example, 164 emissions and integrations are carried out in the third ranging action.

Then the flow goes to S88 to carry out a correction process for the third distance value D3. This correction process is carried out by adding a predetermined value to the third distance value D3 calculated in S86 and defining the result as the third distance value D3. The predetermined value herein is set, for example, in the range of −15 to +40 counts, where the third distance value D3 is 1000 counts corresponding to the distance of 3.5 m and where the third distance value D3 is 1900 counts corresponding to the distance of 0.8 m, respectively.

Then the flow moves to S90 to perform an operation to calculate the distance signal, based on the second distance value D2 and the third distance value D3. Namely, the sum of the second distance value D2 and the third distance value D3 is defined as the AF signal y and the distance signal x is calculated according to foregoing Eq. (1) or Eq. (4). After the calculation of the distance signal, the AF ranging processing is then terminated.

After that, when the release button is depressed into a full stroke, the CPU 1 controls the lens driving circuit 7, based on the obtained distance, to perform an appropriate focusing operation of the taking lens 8, and then opens the shutter (not shown) to effect exposure.

Figure 10:
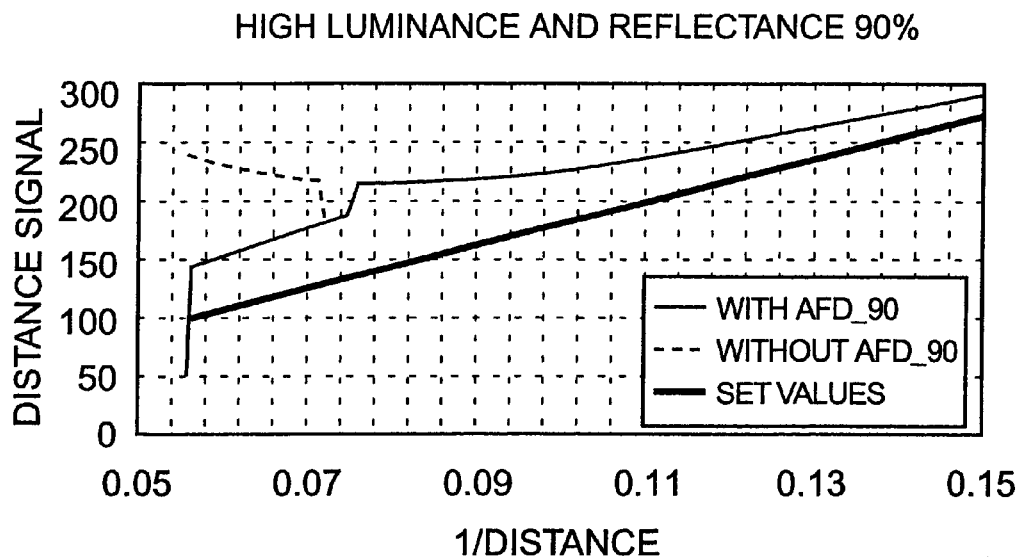
FIG. 10 is a drawing showing measurement results by the distance measuring apparatus according to the first embodiment.
Figure 11:
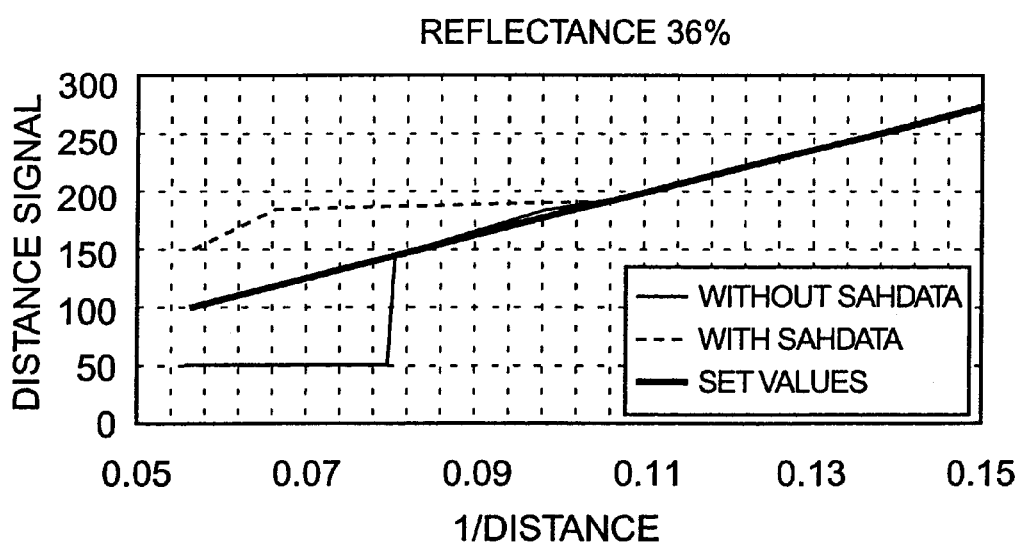
FIG. 11 is a drawing showing measurement results by the distance measuring apparatus according to the first embodiment.

FIGS. 10 and 11 show results of distance measurement in the distance measuring apparatus according to the present embodiment.

FIG. 10 is the data obtained in the measurement of the distance to the object with the reflectance of 90% under the high luminance condition (the high luminance in the luminance range lower than the set value in S18 of FIG. 7). In FIG. 10, "with AFD 90" means that the distance measurement was carried out including the determination process in S60 of FIG. 8. Further, "without AFD 90" means that the distance measurement was carried out excluding the determination process in S60 of FIG. 8. From consideration of FIG. 10, it is seen that the measurement result of the distance signal closer to the set values is obtained on the far side when the determination process of S60 is carried out.

FIG. 11 shows the data obtained when the distance measurement was carried out for the object with the reflectance of 36%. In FIG. 11, "with SAHDATA" means that the distance measurement was carried out including the determination process in S78 of FIG. 8. Further, "without SAH-DATA" means that the distance measurement was carried out excluding the determination process in S78 of FIG. 8. From the consideration of FIG. 11, it is seen that the measurement result of the distance signal closer to the set values is obtained in the range of the inverse of distance of 0.08 to 0.10 when the determination process of S78 is carried out.

Figure 12:
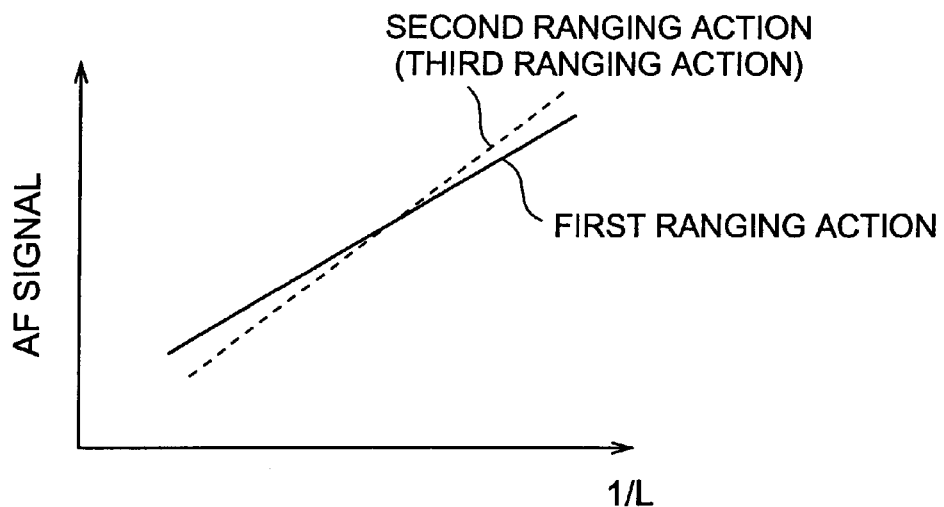
FIG. 12 is a drawing showing relations between the AF signal and the inverse of the distance in continuous distance measurement.

FIG. 12 is a drawing showing the relations between the inverse of the distance and the AF signal.

FIG. 12 shows the data in continuous measurement to measure the distance to the same object. In the continuous measurement, however, the first distance value in the first measurement is not always the same as the second distance value in the measurement thereafter, as shown in FIG. 12, because there occurs change in characteristics of the integrating capacitor.

In the distance measuring apparatus of the present embodiment, therefore, the number of integrations in the second ranging action is set smaller than that in the first ranging action. This can match the slope of the characteristics of the second ranging action with that of the first ranging action in FIG. 12. In the distance measuring apparatus of the present embodiment, the correction is made by adding the predetermined value to the second distance value obtained in the second ranging action. This can increase the second distance value to a value equivalent to the first distance value.

Figure 13:
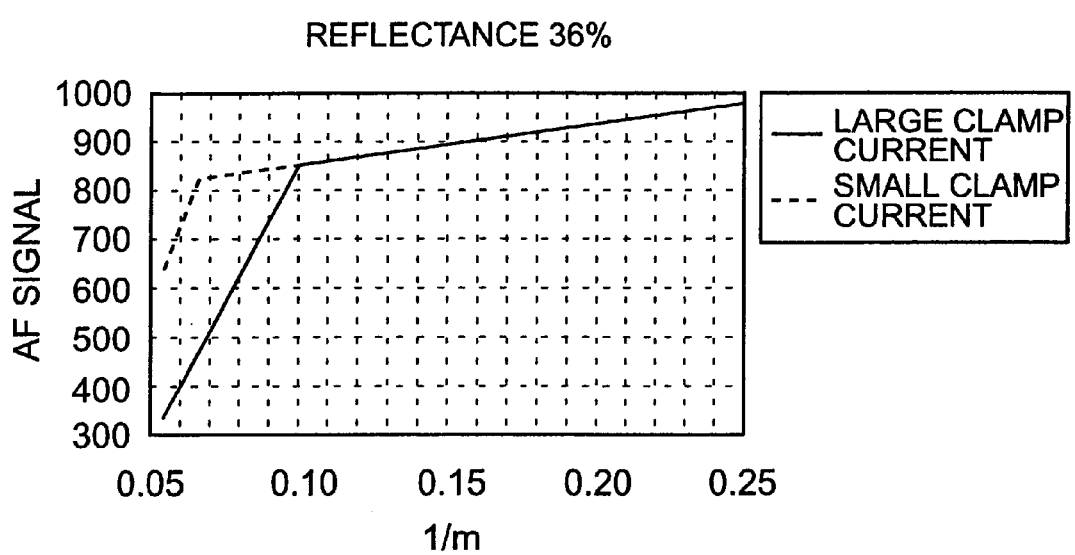
FIG. 13 is a drawing showing distance measurement data obtained when the object has the reflectance of 36%.
Figure 14:
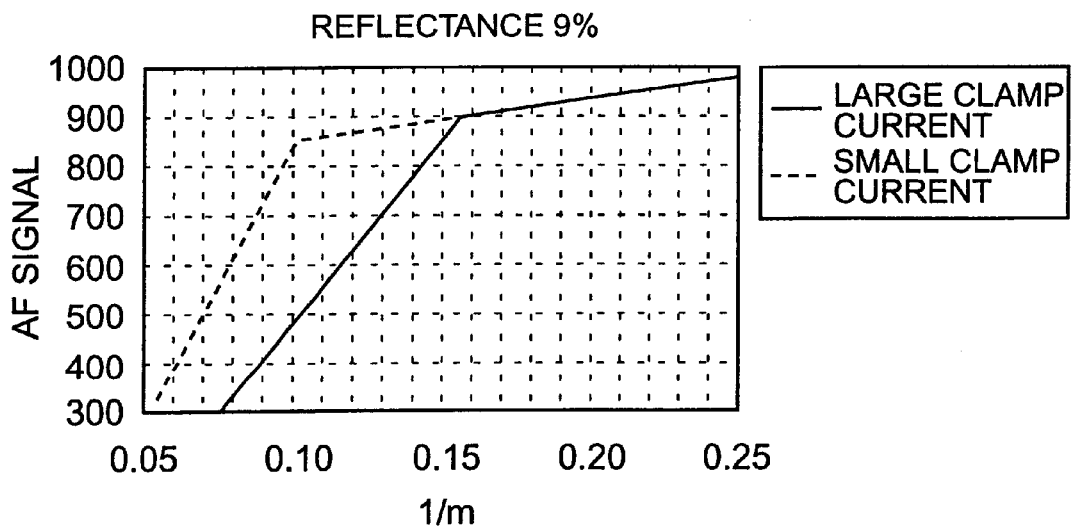
FIG. 14 is a drawing showing distance measurement data obtained when the object has the reflectance of 9%.
Figure 15:
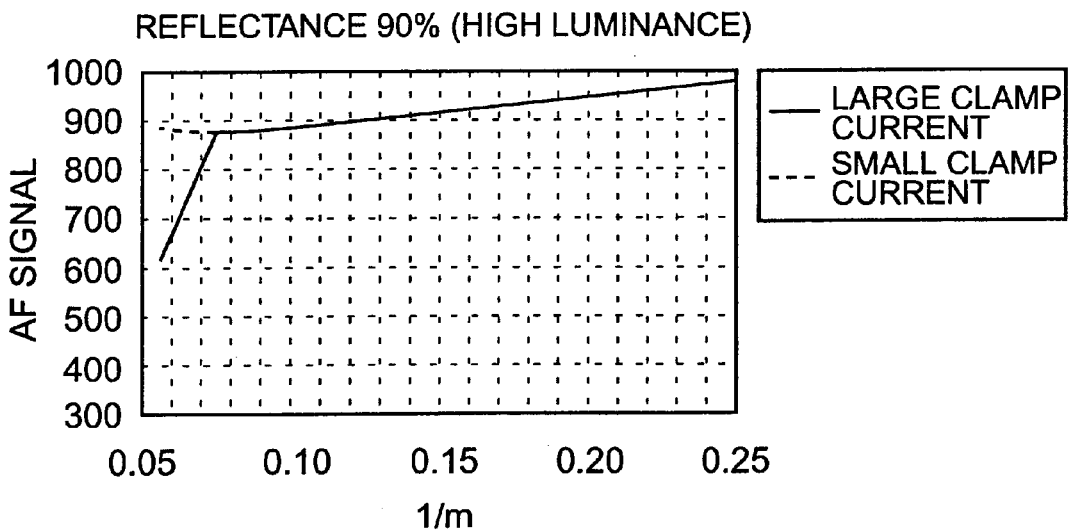
FIG. 15 is a drawing showing distance measurement data obtained when the object has the reflectance of 90%.

FIGS. 13 to 15 show the results of measurement under setting at a large clamp current (where the level of the clamp signal is set high) and under setting at a small clamp current (where the level of the clamp signal is set low) in cases where the object has the reflectance of 36%, 9%, or 90%.

In the distance measuring apparatus of the present embodiment, as described above, even if the second distance value D2 is detected as a near-side value under such conditions that the ambient light luminance is relatively high and the reflectance of the object is large, and if the second distance value D2 is a value nearer than the second set distance, the third distance value D3 is detected with the clamp signal being set at the first level of the high level and the distance to the object is calculated based on the sum of the first distance value D1 and the third distance value D3. This allows the distance to the object to be detected with accuracy.

When the difference between the second distance value D2 and the first distance value D1 is not smaller than the set value E2 and when the second distance value D2 is a value smaller than the set value F and thus farther than the predetermined set distance, the third distance value D3 is detected with the clamp signal being set at the first level and the distance to the object is calculated based on the sum of the first distance value D1 and the third distance value D3. Therefore, when the reflectance of the object is close to the reference reflectance, the third distance value D3 is detected with the clamp signal being set at the first level whereby the third distance value D3 is prevented from being detected as a value nearer than the designed value. This permits the distance to the object to be detected with accuracy.

When the sum of the first distance value D1 and the first distance value D1 is larger than the set value C and when the difference between the second distance value D2 and the first distance value D1 is larger than the set value E1, the third distance value D3 is detected with the clamp signal being set at the second level and the distance to the object is calculated based on the sum of the second distance value D2 and the third distance value D3. For this reason, the third distance value D3 is detected with the clamp signal being set at the second level when the object has a small reflectance, which can reduce the possibility of detecting the third distance value D3 as a value farther than the designed value. This permits the distance to the object to be detected with accuracy.

When the continuous ranging is carried out to detect the distance to the object, based on a plurality of distance values, there will occur change in the characteristics of the integrating capacitor 6 between in the integral processing for the detection of the first distance value and in the integral processing for the detection of the second distance value. However, variation of the second distance value due to the change in the characteristics of the integrating capacitor 6 can be corrected in such a way that the total sum of integral time in the detection of the first distance value is made different from that in the detection of the second distance value and the correction is made by adding the predetermined value to the second distance value. This allows the distance to the object to be detected with accuracy.

Although the distance measuring apparatus of the present embodiment is constructed to perform the integral operations by a multiplicity of discharges from the voltage of the integrating capacitor 6 in accordance with the output ratio outputted from the arithmetic circuit 14 in the ranging actions of the AF ranging processing, the distance measuring apparatus according to the present invention does not always have to be limited to such structure but may be configured to perform the integral operation by charging the integrating capacitor 6 according to the output ratio.

Although the distance measuring apparatus of the present embodiment is constructed to perform the first integral operation by discharging of the integrating capacitor 6 and the second integral operation by charging of the integrating capacitor 6 in the distance measurement operation of the AF ranging processing and to determine the distance from the time necessary for the second integral operation, the distance measuring apparatus according to the present invention does not have to be limited to such structure but may be arranged to perform discharging or charging (first integral operation) of the integrating capacitor 6 according to the output ratio, perform A/D conversion of a voltage value of a decrease due to the discharging or a voltage value of an increase due to the charging, and determine the distance, based on the result.

Second Embodiment

The distance measuring apparatus according to the second embodiment will be described below.

In the distance measuring apparatus of the first embodiment one of the determination conditions in S74 of the AF ranging processing was whether the sum (D1+D1) of the first distance value D1 and the first distance value D1 was larger than the set value C, whereas in the distance measuring apparatus of the present embodiment one of the determination conditions in S74 is whether the sum (D1+D2) of the first distance value D1 and the second distance value D2 is larger than the set value C or whether the sum (D2+D2) of the second distance value D2 and the second distance value D2 is larger than the set value C. The distance measuring apparatus of the present embodiment is substantially the same as the distance measuring apparatus of the first embodiment in terms of the other device components or processing.

Figure 16:
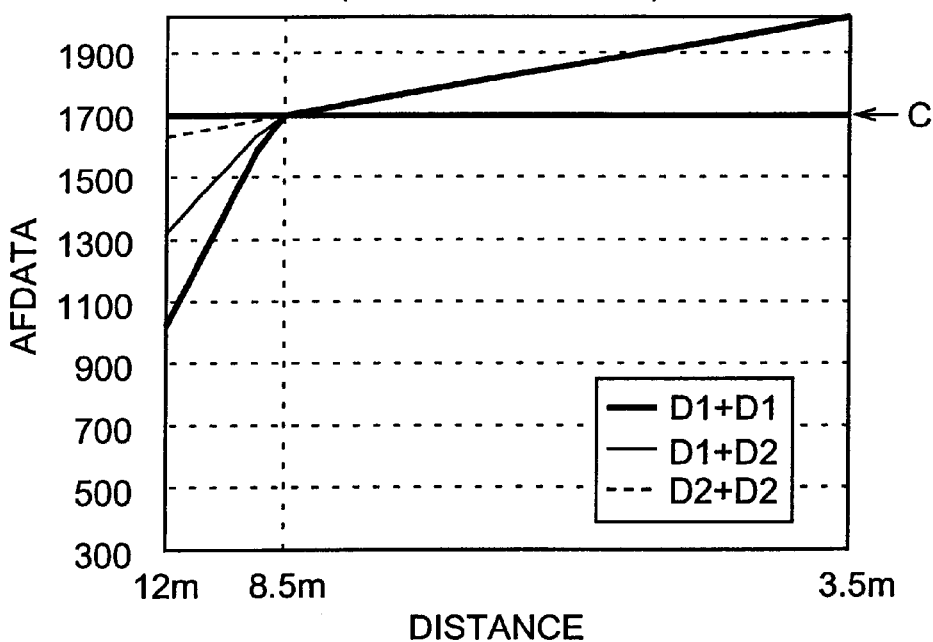
FIG. 16 is a drawing showing relations between the AF signal (AFDATA) and the distance under different determination conditions in S74 of the AF ranging processing.
Figure 17:
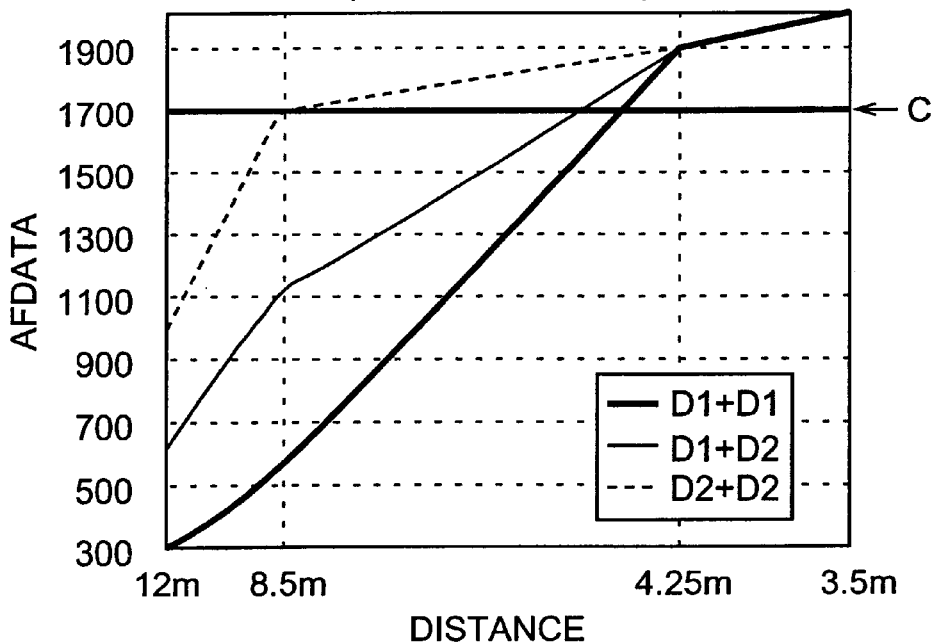
FIG. 17 is a drawing showing relations between the AF signal (AFDATA) and the distance under different determination conditions in S74 of the AF ranging processing.

FIGS. 16 and 17 show the relations between the distance and the AF signal (AFDATA) under the different determination conditions in S74.

FIG. 16 presents the data in the ranging for the object with the reflectance of 36% being the reference reflectance. From consideration of FIG. 16, a characteristic change rate at the distance of 8.5 m is smaller with the determination condition of D1+D2 (when D1+D2>C), as compared with that with the determination condition of D1+D1 (when D1+D1>C). The characteristic change is much smaller with the determination condition of D2+D2 (when D2+D2>C).

FIG. 17 provides the data in the ranging for the object with the reflectance of 9%. From consideration of FIG. 17, a characteristic change rate at the distance of 4.25 m is smaller with the determination condition of D1+D2 (when D1+D2>C), as compared with that with the determination condition of D1+D1 (when D1+D1>C). The characteristic change is much smaller with the determination condition of D2+D2 (when D2+D2>C).

Figure 18:
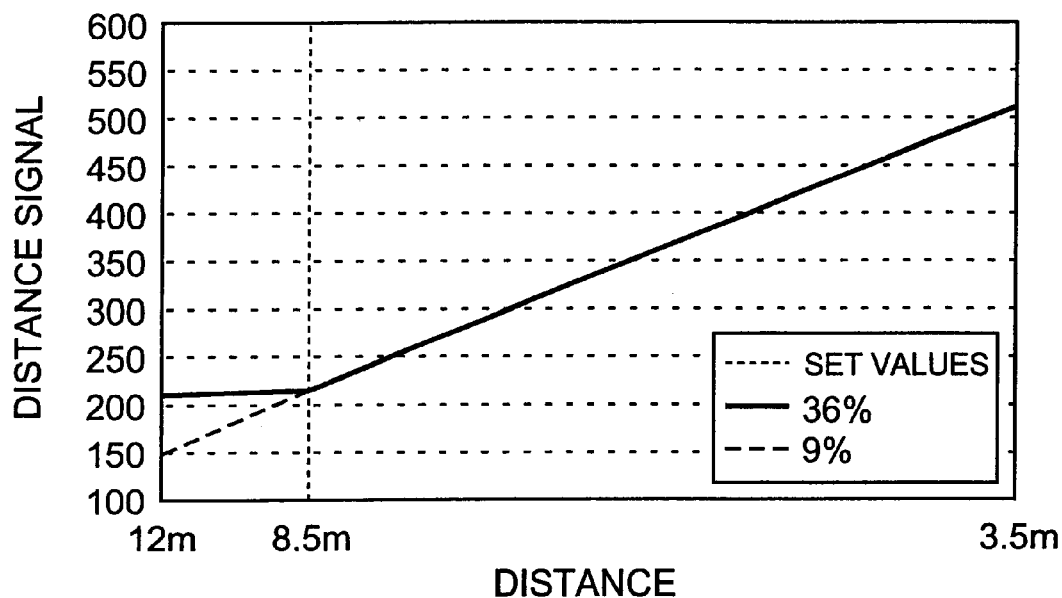
FIG. 18 is a drawing showing distance measurement results (comparative example) obtained when the distance is measured without the determination process of S74 in the AF ranging processing.
Figure 19:
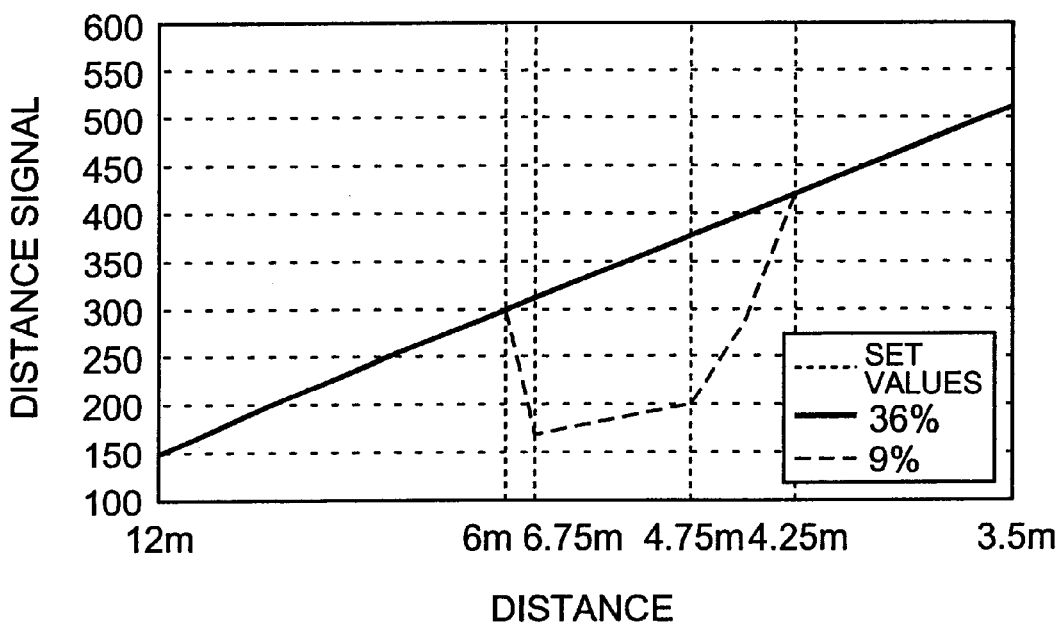
FIG. 19 is a drawing showing distance measurement results (comparative example) obtained when the distance is measured without the determination process of S74 in the AF ranging processing.

FIGS. 18 and 19 show the results of measurement (comparative example) in which the distance was measured without the determination process of S74 in the AF ranging processing of FIGS. 7 and 8.

From consideration of FIG. 18, satisfactory linearity is achieved in the measurement for the object with the reflectance of 9%. However, the distance signal calculated becomes a little larger on the far side over 8.5 m in the measurement for the object with the reflectance of 36%. In the distance measurement of FIG. 18 the set value E2 was set at a, small value (30).

From consideration of FIG. 19, satisfactory linearity is achieved in the measurement for the object with the reflectance of 36%. However, the distance signal calculated becomes a little smaller in the distance range of 4.25 to 6 m in the measurement for the object with the reflectance of 9%.

Figure 20:
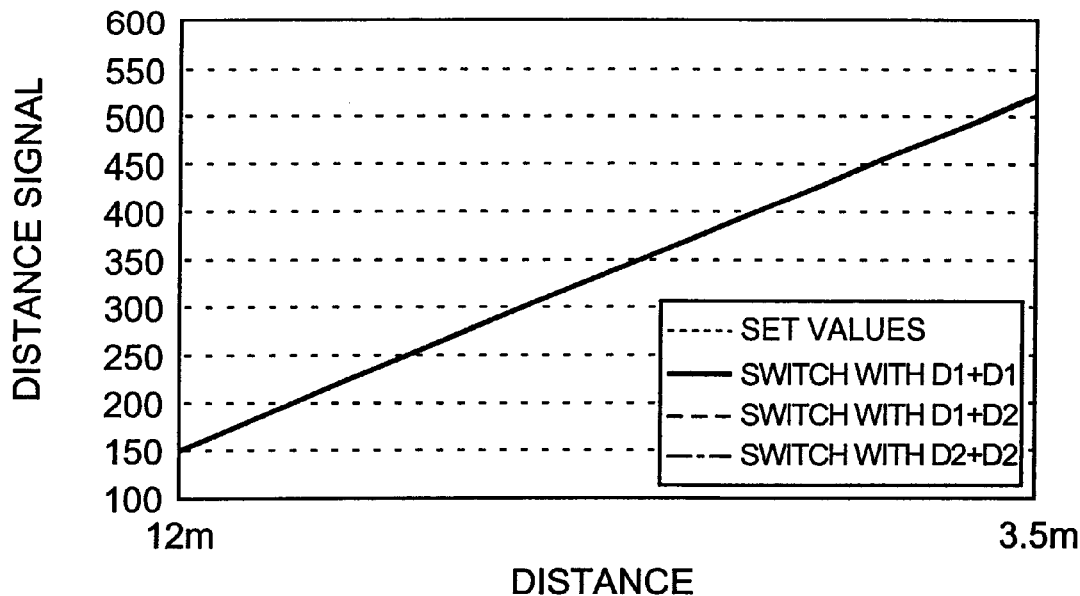
FIG. 20 is a drawing showing distance measurement results in the distance measuring apparatus according to the second embodiment.
Figure 21:
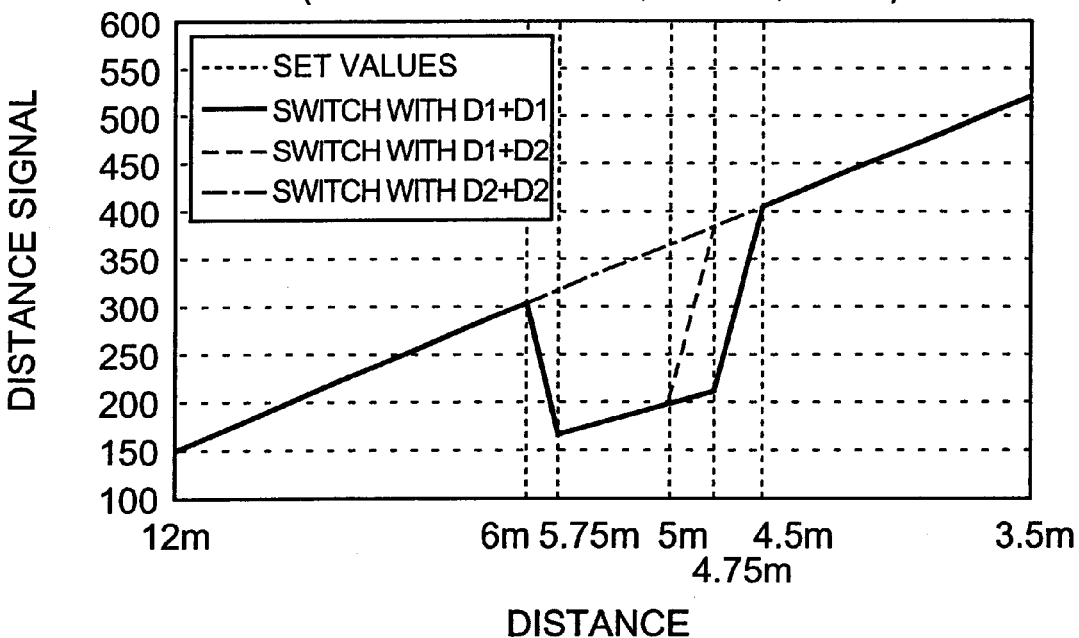
FIG. 21 is a drawing showing distance measurement results in the distance measuring apparatus according to the second embodiment.
Figure 22:
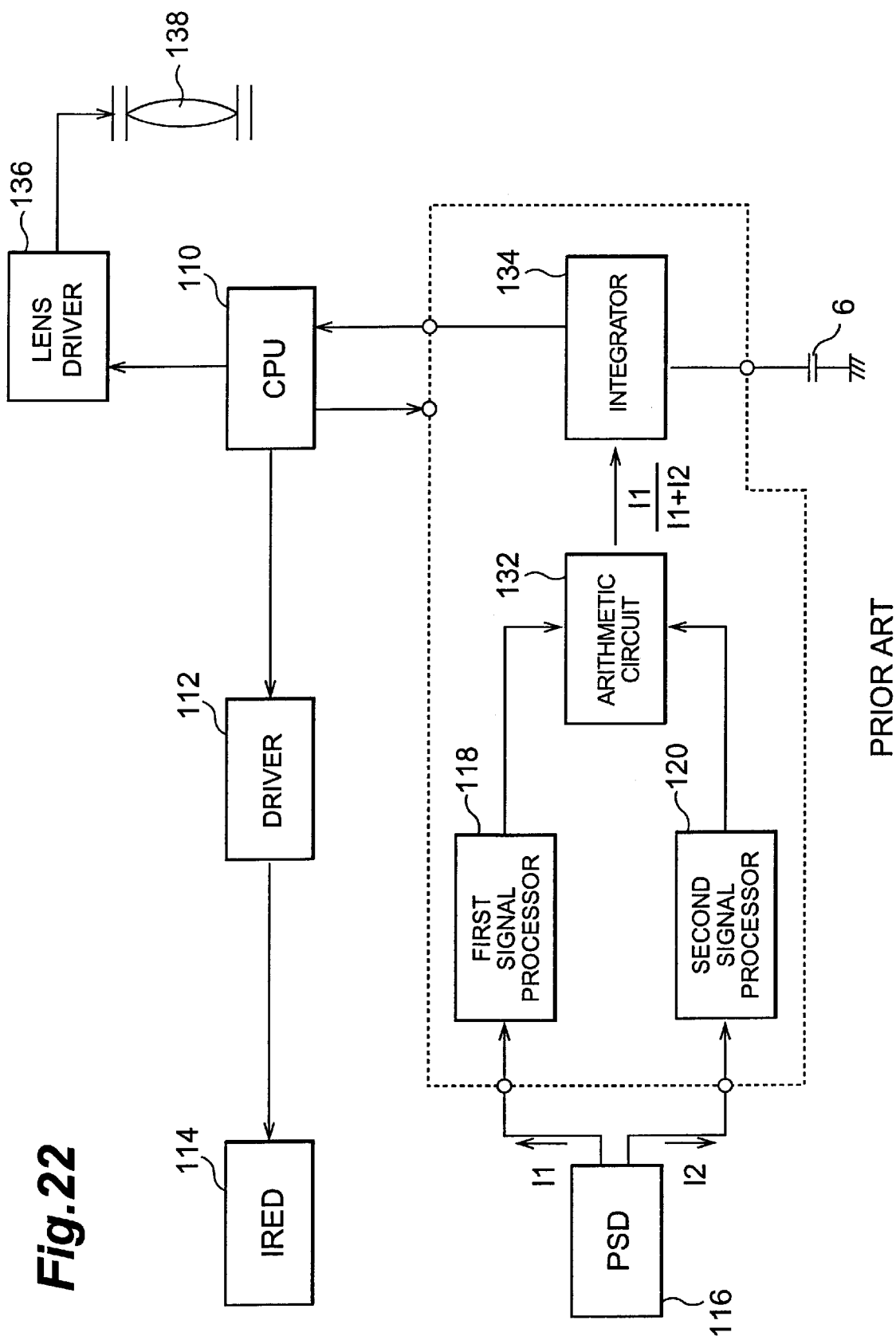
FIG. 22 is a block diagram of the distance measuring apparatus according to the first prior art.
Figure 23:
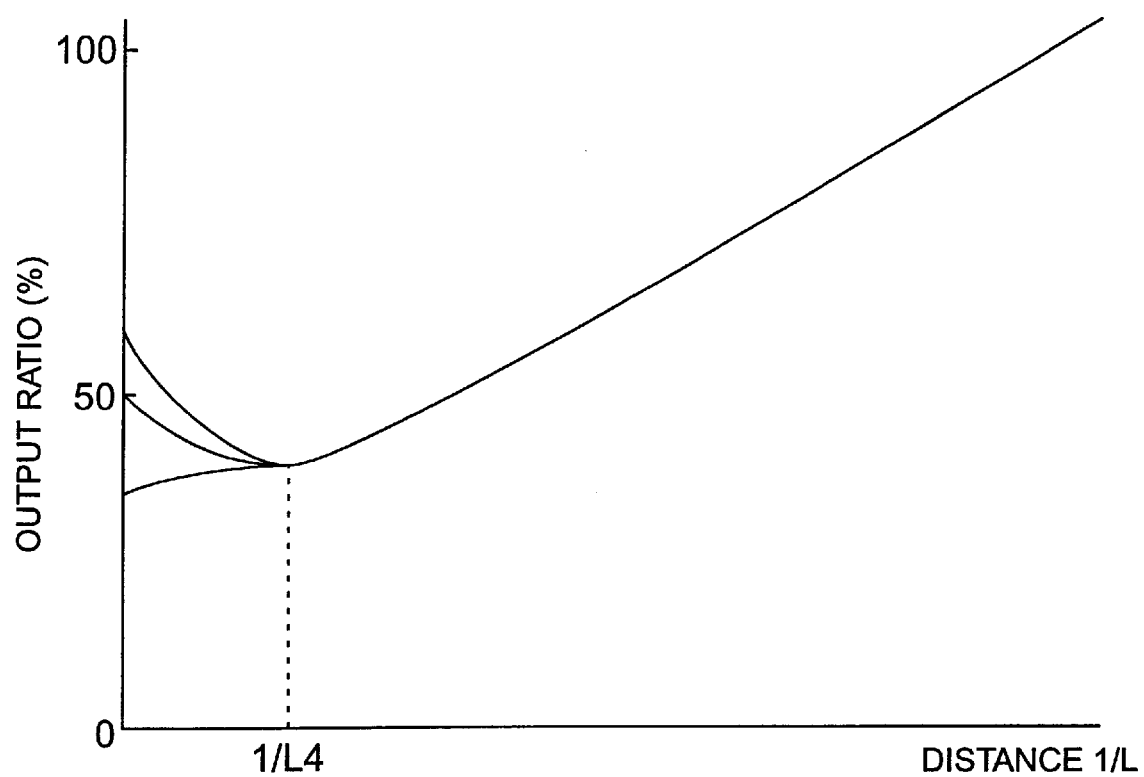
FIG. 23 is a drawing showing a relation between the distance to the object and the AF signal outputted from the integrating circuit in the first prior art.
Figure 24:
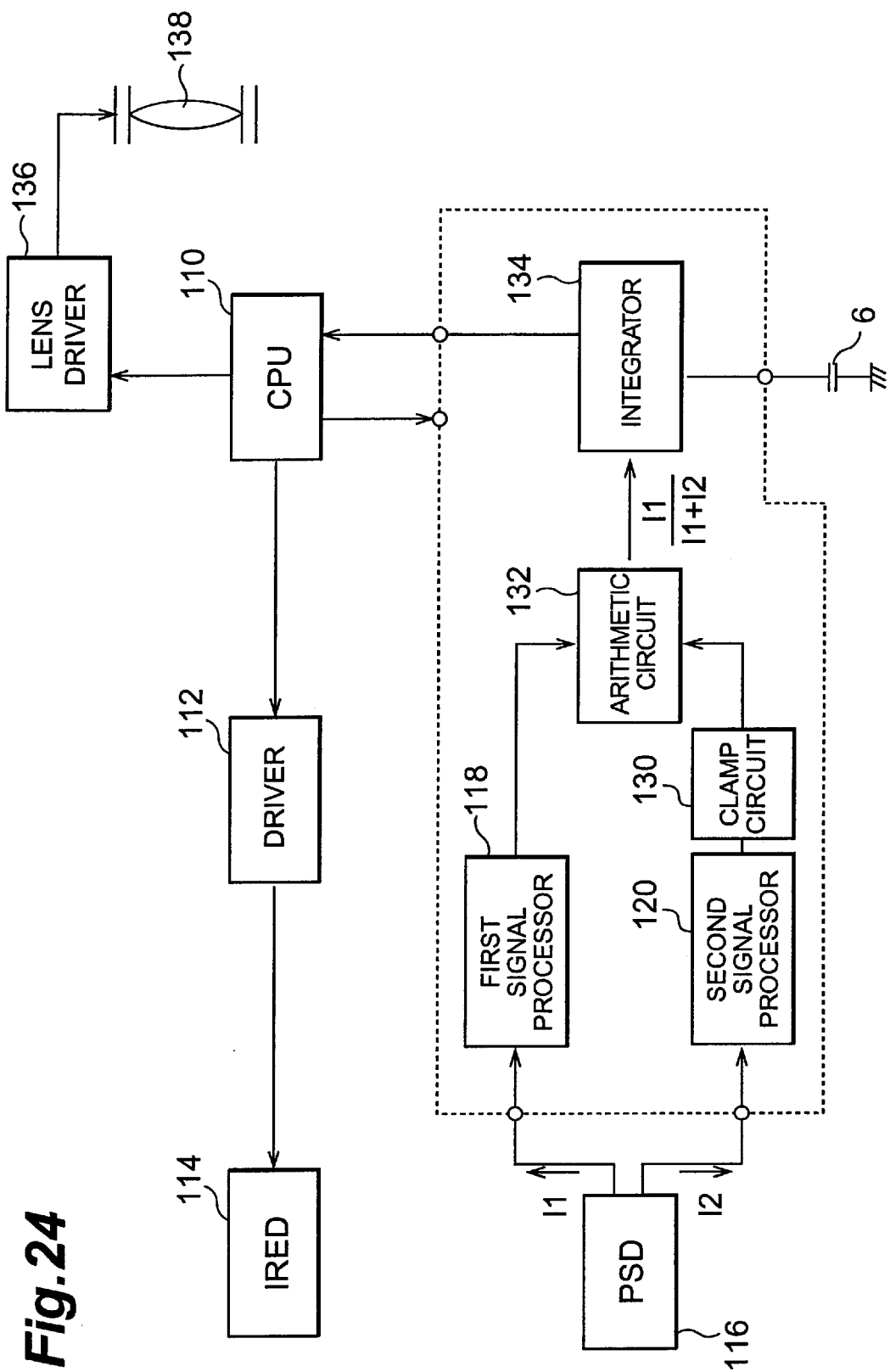
FIG. 24 is a block diagram of a modification example of the distance measuring apparatus according to the first prior art.
Figure 25:
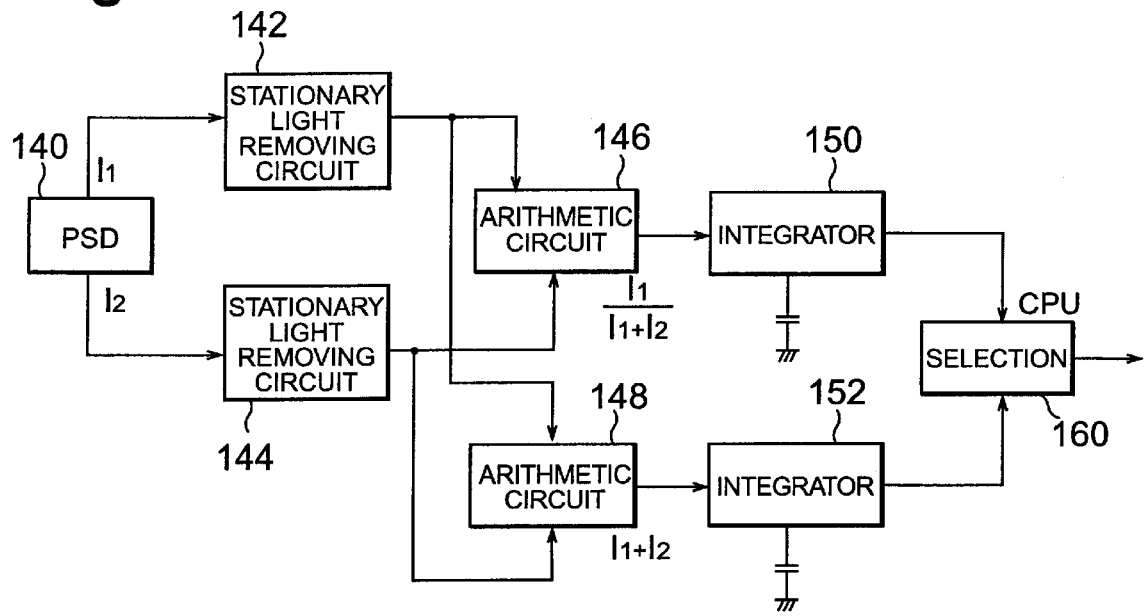
FIG. 25 is a block diagram of the distance measuring apparatus according to the second prior art.
Figure 26:
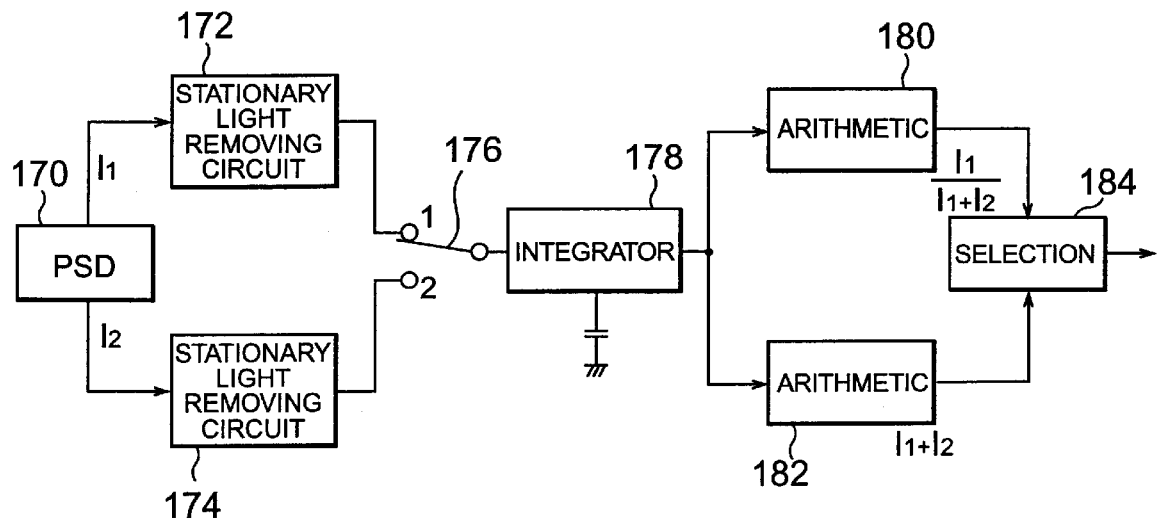
FIG. 26 is a block diagram of the distance measuring apparatus according to the third prior art.
Figure 27:
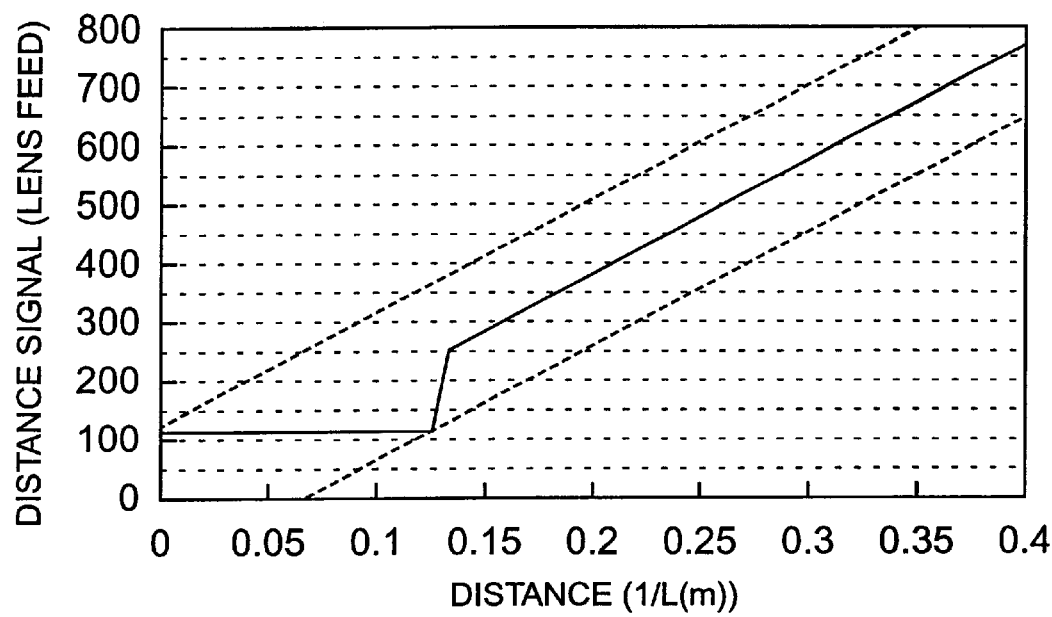
FIG. 27 is a graph showing a relation between the distance and the distance signal obtained by the distance measuring apparatus of the first prior art when the reflectance of the object is 36%.
Figure 28:
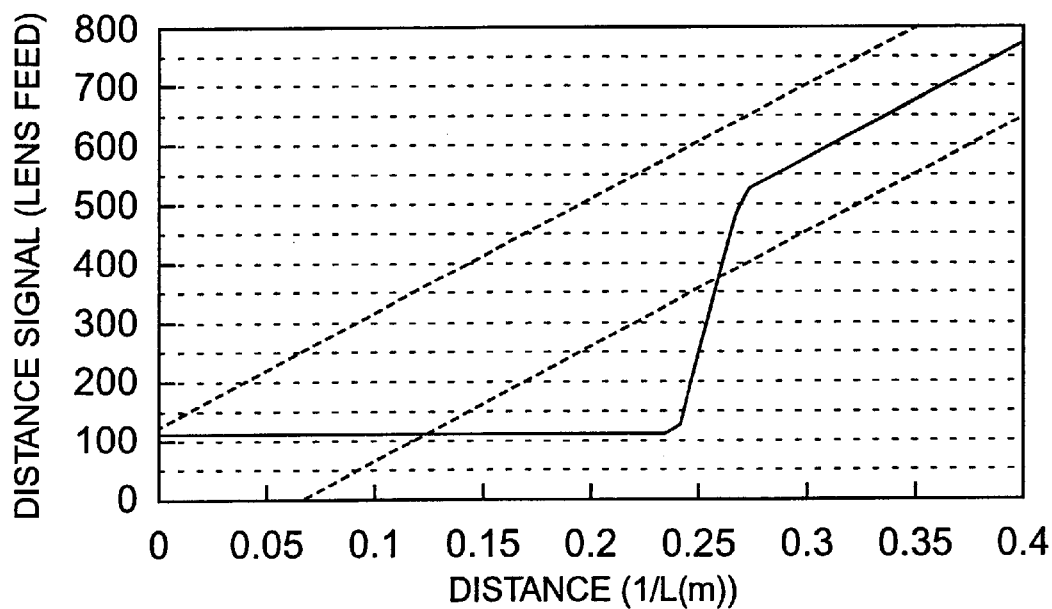
FIG. 28 is a graph showing a relation between the distance and the distance signal obtained by the distance measuring apparatus of the first prior art when the reflectance of the object is 9%.
Figure 29:
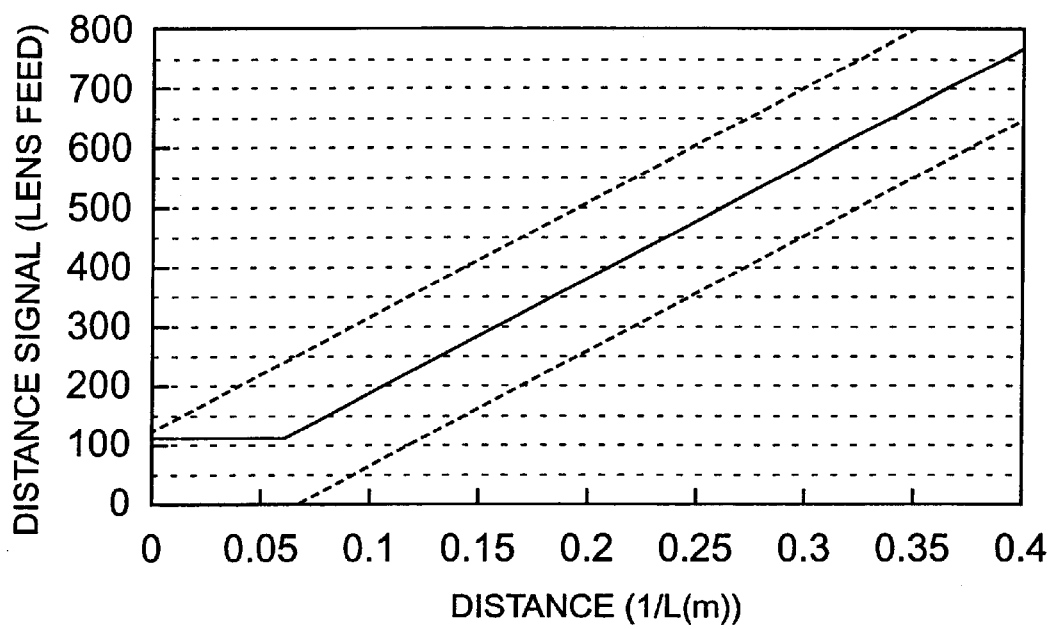
FIG. 29 is a graph showing a relation between the distance and the distance signal obtained by the distance measuring apparatus of the second and third prior arts when the reflectance of the object is 36%.
Figure 30:
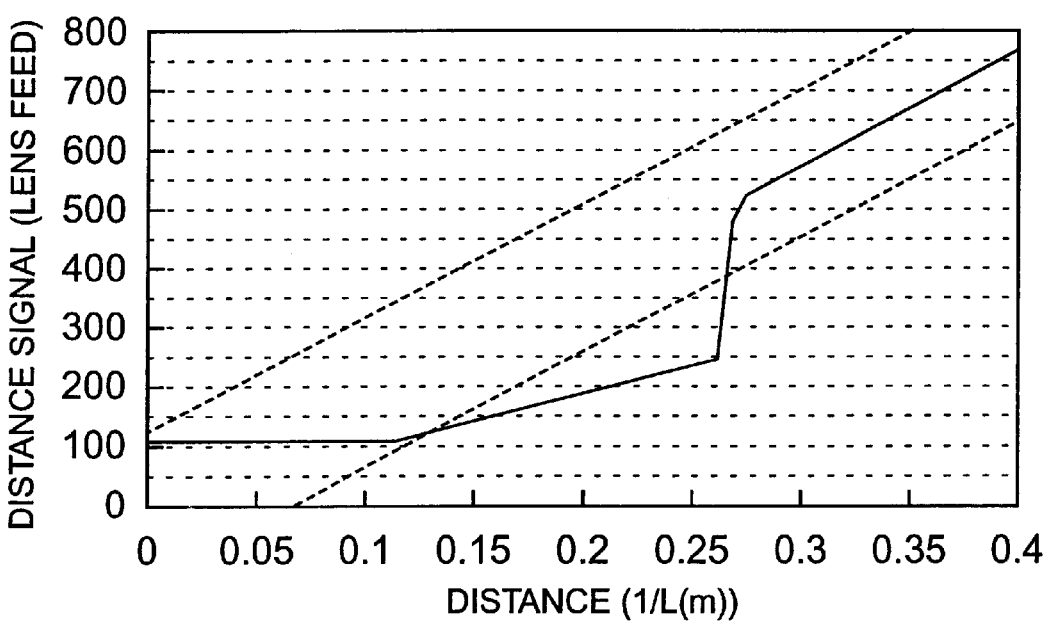
FIG. 30 is a graph showing a relation between the distance and the distance signal obtained by the distance measuring apparatus of the second and third prior arts when the reflectance of the object is 9%.
Figure 31:
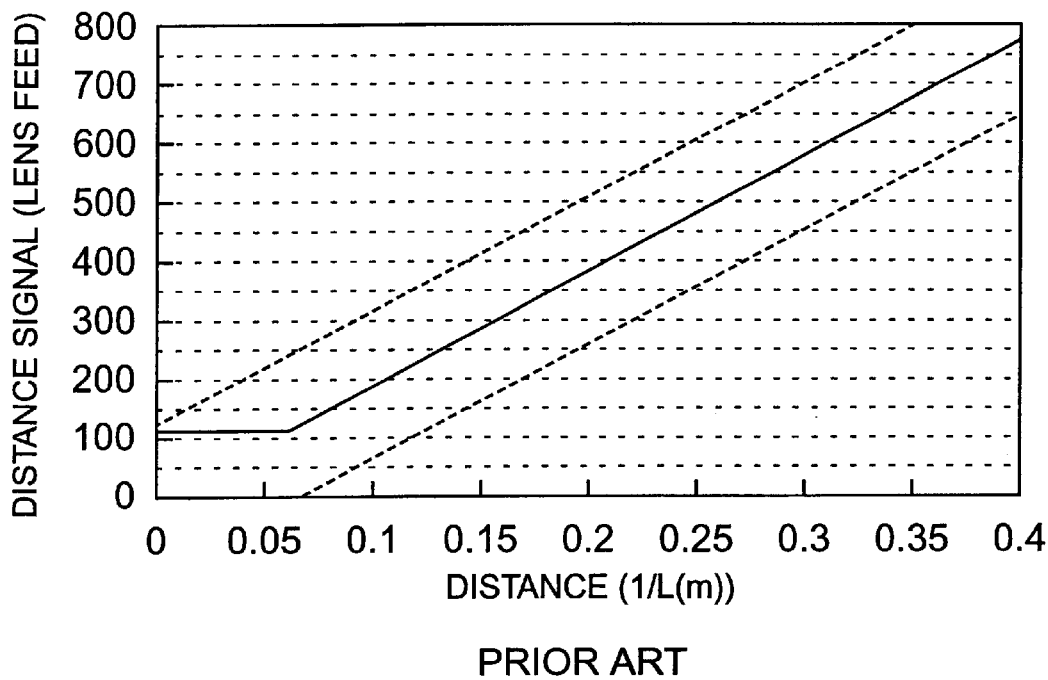
FIG. 31 is a graph showing a relation between the distance and the distance signal obtained by the distance measuring apparatus of the first prior art when the level of the clamp signal Ic is low and when the reflectance of the object is 36%.
Figure 32:
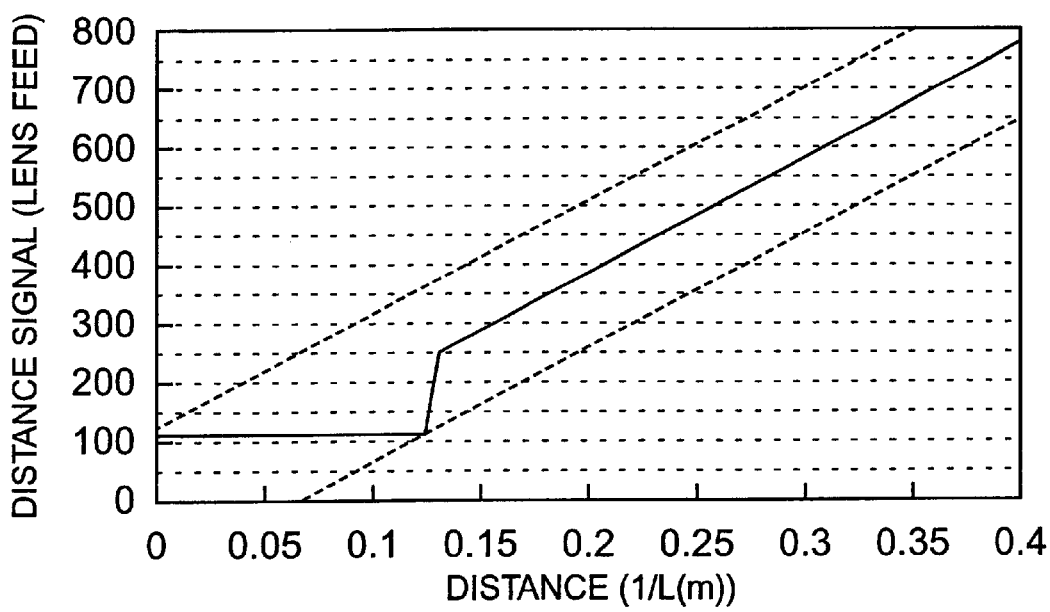
FIG. 32 is a graph showing a relation between the distance and the distance signal obtained by the distance measuring apparatus of the first prior art when the level of the clamp signal Ic is low and when the reflectance of the object is 9%.
Figure 33:
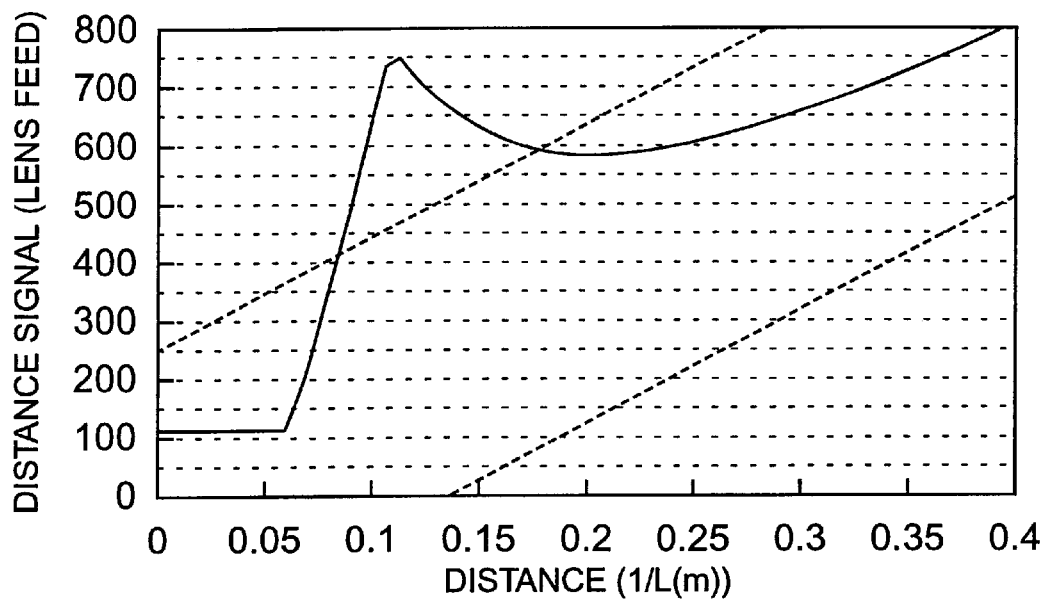
FIG. 33 is a graph showing a relation between the distance and the distance signal obtained by the distance measuring apparatus of the first prior art when the level of the clamp signal Ic is low, when the ambient light luminance is high, and when the reflectance of the object is 36%.
Figure 34:
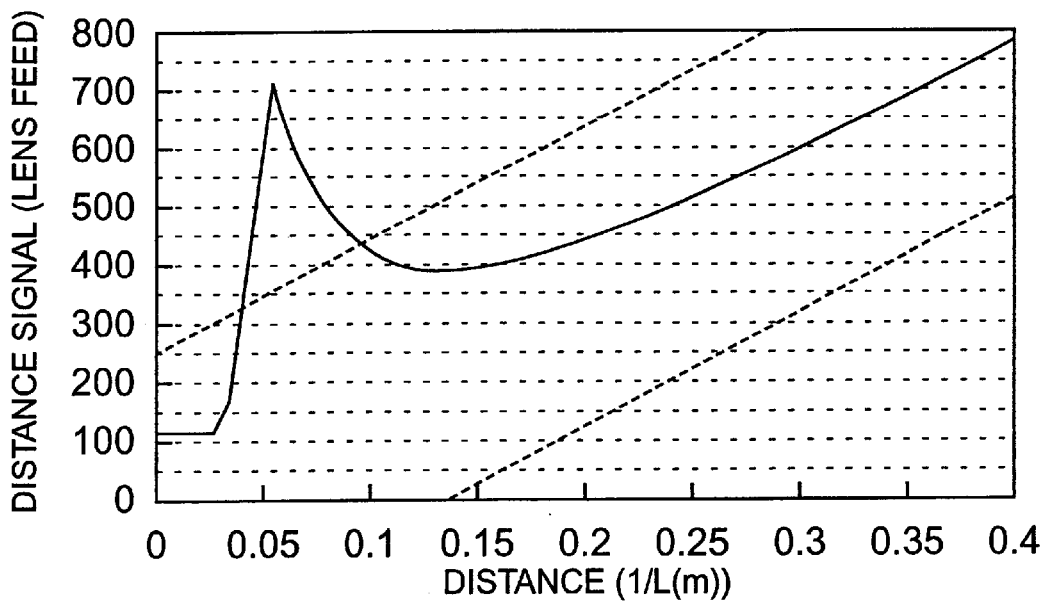
FIG. 34 is a graph showing a relation between the distance and the distance signal obtained by the distance measuring apparatus of the first prior art when the level of the clamp signal Ic is low, when the ambient light luminance is high, and when the reflectance of the object is 9%.
Figure 35:
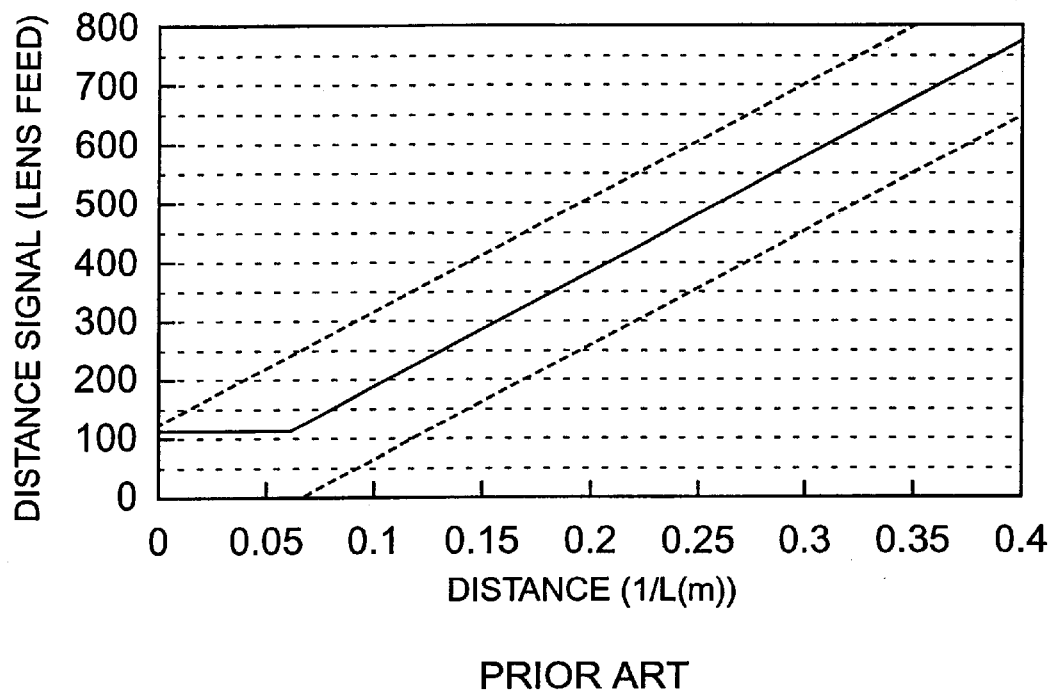
FIG. 35 is a graph showing a relation between the distance and the distance signal obtained by the distance measuring apparatus of the first prior art when the quantity of the light projected from the IRED is four times larger and when the reflectance of the object is 36%.
Figure 36:
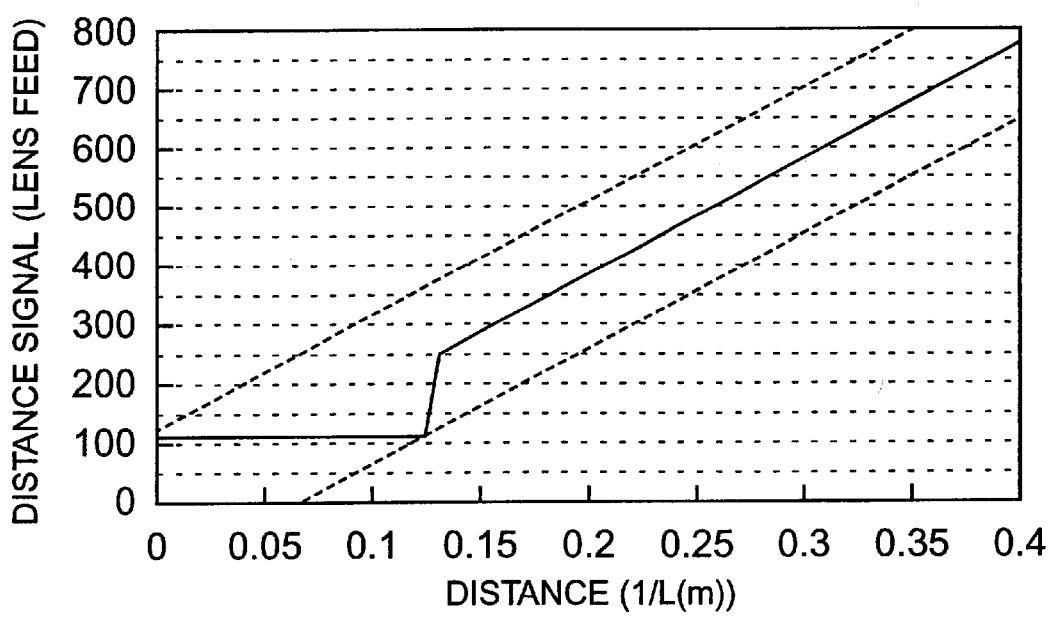
FIG. 36 is a graph showing a relation between the distance and the distance signal obtained by the distance measuring apparatus of the first prior art when the quantity of the light projected from the IRED is four times larger and when the reflectance of the object is 9%.

FIGS. 20 and 21 present the results of measurement by the distance measuring apparatus of the present embodiment and by the distance measuring apparatus of the first embodiment, which are the results of the distance measurement carried out with the determination process of S74 in the AF ranging processing.

FIG. 20 presents the data of the results of the measurement for the object with the reflectance of 36%. From consideration of FIG. 20, satisfactory linearity is achieved with the measurement results close to the designed values in either case of the determination conditions D1+D1, D1+D2, and D2+D2.

FIG. 21 provides the data of the results of the measurement for the object with the reflectance of 9%. From consideration of FIG. 21, the distance signal calculated becomes a little smaller in the distance range of 4.5 to 6 m with the determination condition D1+D1. From comparison with the characteristics of the reflectance of 9% (dashed line) in FIG. 19, it is seen that the distance range where the distance signal is calculated a little smaller is decreased and the measurement accuracy is improved.

With the determination condition D1+D2, the distance signal calculated becomes a little smaller in the distance range of 4.75 to 6 m. From comparison with the characteristics of the reflectance of 9% (dashed line) in FIG. 19, it is seen that the distance range where the distance signal is calculated a little smaller is also decreased and the measurement accuracy is improved. With the determination condition D2+D2, satisfactory linearity is achieved with the measurement results close to the designed values.

As described above, since the distance measuring apparatus of the present embodiment is constructed to use the determination condition of D1+D2 or D2+D2 instead of D1+D1 in S74 of the AF ranging processing, it can provide the measurement results closer to the designed values and can improve the measurement accuracy.

According to the present invention, as detailed above, when under the conditions of the ambient light luminance being relatively high and the object having a large reflectance the second distance value is detected as a near-side value and when the second distance value is a value nearer than the second set distance, the third distance value is detected with the clamp signal being set at the first level of the high level and the distance to the object is calculated based on the sum of the first distance value and the third distance value. For this reason, the distance to the object can be detected with accuracy.

Even if the difference of the second distance value from the first distance value is not smaller than the set value and if the second distance value is a value smaller than the set value and thus farther than the preset distance, the third distance value is detected with the clamp signal being set at the first level and the distance to the object is calculated based on the sum of the first distance value and the third distance value. For this reason, when the reflectance of the object is close to the reference reflectance, the third distance value is detected with the clamp signal being set at the first level, whereby the third distance value is prevented from being detected as a value nearer than the designed value. This permits the distance to the object to be detected with accuracy.

When the sum of the first distance value and the first distance value is larger than the set value and when the difference of the second distance value from the first distance value is larger than the set value, the third distance value is detected with the clamp signal being set at the second level and the distance to the object is calculated based on the sum of the second distance value and the third distance value. For this reason, when the reflectance of the object is low, the third distance value is detected with the clamp signal being set at the second level, which reduces the possibility of detecting the third distance value as a value farther than the designed value. This permits the distance to the object to be detected with accuracy.

When the continuous ranging is carried out to detect the distance to the object, based on a plurality of distance values, there occurs change in the characteristics of the integrating capacitor between in the integral processing for the detection of the first distance value and in the integral processing for the detection of the second distance value. However, the variation of the second distance value due to the change in the characteristics of the integrating capacitor can be corrected in such a way that the total sum of integral time in the detection of the first distance value is made different from that in the detection of the second distance value and the correction is made by adding the predetermined value to the second distance value. This permits the distance to the object to be detected with accuracy.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A distance measuring apparatus comprising:

light projecting means for projecting light toward an object at a distance to be measured;

light detecting means for detecting reflected light of the light projected toward the object, at a reception position on a position sensitive device according to the distance to the object, and for outputting a far signal, which increases with an increase in the distance if quantity of detected light is constant, and a near signal, which increases with a decrease in the distance if the quantity of detected light is constant;

clamping means receiving the far signal and comparing the far signal with a level of a clamp signal, wherein said clamping means outputs the far signal if the far signal is not less than the level of the clamp signal, and otherwise outputs the clamp signal;

arithmetic means for calculating a ratio of the near signal and a signal output from said clamping means to output an output ratio signal;

integrating means for cumulatively integrating the output ratio signal and outputting an integral signal according to the integrating; and control means for controlling each of projection of the light by said light projecting means, the level of the clamp signal in said clamping means, and total integrating time for the output ratio signal in said integrating means, and for detecting a distance value, based on the integral signal output from said integrating means, wherein said control means:

(a) sets the clamp signal to a first level, and detects a first distance value, based on the integral signal output from said integrating means when the total integrating time for the output ratio signal in said integrating means is a first time;

(b) when the first distance value is larger than a first set distance, sets the clamp signal to a second level smaller than the first level, and detects a second distance value, based on the integral signal output from said integrating means when the total integrating time for the output ratio signal in said integrating means is a second time;

(c) when the second distance value is smaller than a second set distance, or, when the second distance value is not smaller than the second set distance and a difference between the second distance value and the first distance value is smaller than a first set value, sets the clamp signal to the first level, detects a third distance value, based on the integral signal output from said integrating means when the total integrating time for the output ratio signal in said integrating means is a third time, and calculates the distance to the object, based on a sum of the first distance value and the third distance value; and (d) when the second distance value is not smaller than the second set distance and when the difference between the second distance value and the first distance value is not smaller than the first set value, sets the clamp signal to the second level, detects the third distance value, based on the integral signal output from said integrating means when the total integrating time of the output ratio signal in said integrating means is the third time, and calculates the distance to the object, based on a sum of said second distance value and said third distance value.

2. A distance measuring apparatus comprising:

light projecting means for projecting light toward an object at a distance to be measured;

light detecting means for detecting reflected light of the light projected toward the object, at a reception position on a position sensitive device according to the distance to the object, and for outputting a far signal, which increases with an increase in the distance if quantity of detected light is constant, and a near signal, which increases with a decrease in the distance if the quantity of detected light is constant;

clamping means receiving the far signal and comparing the far signal with a level of a clamp signal, wherein said clamping means outputs the far signal if the far signal is not less than the level of the clamp signal, and otherwise outputs the clamp signal;

arithmetic means for calculating a ratio of the near signal and a signal output from said clamping means to output an output ratio signal;

integrating means for cumulatively integrating the output ratio signal and outputting an integral signal according to the integrating; and control means for controlling each of projection of the light by said light projecting means, the level of the clamp signal in said clamping means, and total integrating time for the output ratio signal in said integrating means, and for detecting a distance value, based on the integral signal output from said integrating means, wherein said control means:

(a) sets the clamp signal to a first level, and detects a first distance value, based on the integral signal output from said integrating means when the total integrating time for the output ratio signal in said integrating means is a first time;

(b) when the first distance value is larger than a first set distance, sets the clamp signal to a second level smaller than the first level, and detects a second distance value, based on the integral signal output from said integrating means when the total integrating time for the output ratio signal in said integrating means is a second time;

(c) when a difference between the second distance value and the first distance value is smaller than a first set value, or, when the difference between the second distance value and the first distance value is not smaller than the first set value and the second distance value is larger than a third set distance, sets the clamp signal to said first level, detects a third distance value, based on the integral signal output from said integrating means when the total integrating time for the output ratio signal in said integrating means is a third time, and calculates the distance to the object, based on a sum of the first distance value and the third distance value; and (d) when the difference between the second distance value and the first distance value is not smaller than the first set value and the second distance value is not larger than the third set distance, sets the clamp signal to the second level, detects the third distance value, based on the integral signal output from said integrating means when the total integration time for the output ratio signal in said integrating means is the third time, and calculates the distance to the object, based on a sum of the second distance value and the third distance value.

3. A distance measuring apparatus comprising:

light projecting means for projecting light toward an object at a distance to be measured;

light detecting means for detecting reflected light of the light projected toward the object, at a reception position on a position sensitive device according to the distance to the object, and for outputting a far signal, which increases with an increase in the distance if quantity of detected light is constant, and a near signal, which increases with a decrease in the distance if the quantity of detected light is constant;

clamping means receiving the far signal and comparing the far signal with a level of a clamp signal, wherein said clamping means outputs the far signal if the far signal is not less than the level of the clamp signal, and otherwise outputs the clamp signal;

arithmetic means for calculating a ratio of the near signal and a signal output from said clamping means to output an output ratio signal;

integrating means for cumulatively integrating the output ratio signal and outputting an integral signal according to the integrating; and control means for controlling each of projection of the light by said light projecting means, the level of the clamp signal in said clamping means, and total integrating time for the output ratio signal in said integrating means, and for detecting a distance value, based on the integral signal output from said integrating means, wherein said control means:

(a) sets the clamp signal to a first level, and detects a first distance value, based on the integral signal output from said integrating means when the total integrating time for the output ratio signal in said integrating means is a first time;

(b) when the first distance value is larger than a first set distance, sets the clamp signal to a second level smaller than the first level, and detects a second distance value, based on the integral signal output from said integrating means when the total integrating time for the output ratio signal in said integrating means is a second time;

(c) when either (i) a sum of the first distance value and the first distance value is not larger than a second set value or (ii) a difference between the second distance value and the first distance value is not larger than a third set value and the difference between the second distance value and the first distance value is smaller than a first set value, sets the clamp signal to the first level, detects a third distance value, based on the integral signal output from said integrating means when the total integrating time for the output ratio signal in said integrating means is a third time, and calculates the distance to the object, based on a sum of the first distance value and the third distance value;

(d) when the sum of the first distance value and the first distance value is larger than the second set value and the difference between the second distance value and the first distance value is larger than the third set value, or, when either (i) the sum of the first distance value and the first distance value is not larger than the second set value or (ii) the difference between the second distance value and the first distance value is not larger than the third set value and the difference between the second distance value and the first distance value is not smaller than the first set value, sets the clamp signal to the second level, detects the third distance value, based on the integral signal output from said integrating means when the total integrating time for the output ratio signal in said integrating means is the third time, and calculates the distance to the object, based on a sum of the second distance value and said third distance value.

4. A distance measuring apparatus comprising:

light projecting means for projecting light toward an object at a distance to be measured;

light detecting means for detecting reflected light of the light projected toward the object, at a reception position on a position sensitive device according to the distance to the object, and for outputting a far signal, which increases with an increase in the distance if quantity of detected light is constant, and a near signal, which increases with a decrease in the distance if the quantity of detected light is constant;

clamping means receiving the far signal and comparing the far signal with a level of a clamp signal, wherein said clamping means outputs the far signal if the far signal is not less than the level of the clamp signal, and otherwise outputs the clamp signal;

arithmetic means for calculating a ratio of the near signal and a signal output from said clamping means to output an output ratio signal;

integrating means for cumulatively integrating the output ratio signal and outputting an integral signal according to the integrating; and control means for controlling each of projection of the light by said light projecting means, the level of the clamp signal in said clamping means, and total integrating time for the output ratio signal in said integrating means, and for detecting a distance value, based on the integral signal output from said integrating means, wherein said control means:

(a) sets the clamp signal to a first level, and detects a first distance value, based on the integral signal output from said integrating means when the total integrating time for the output ratio signal in said integrating means is a first time;

(b) when the first distance value is larger than a first set distance, sets the clamp signal to a second level smaller than the first level, and detects a second distance value, based on the integral signal output from said integrating means when the total integrating time for the output ratio signal in said integrating means is a second time;

(c) when either (i) a sum of the first distance value and the second distance value is not larger than a second set value, or (ii) a difference between the second distance value and the first distance value is not larger than a third set value and the difference of between the second distance value and the first distance value is smaller than a first set value, sets the clamp signal to the first level, detects a third distance value, based on the integral signal output from said integrating means when the total integrating time for the output ratio signal in said integrating means is a third time, and calculates the distance to the object, based on a sum of the first distance value and the third distance value; and (d) when a sum of the first distance value and the second distance value is larger than the second set value and the difference between the second distance value and the first distance value is larger than the third set value, or, when either (i) the sum of the first distance value and the second distance value is not larger than the second set value or (ii) the difference between the second distance value and the first distance value is not larger than the third set value and the difference between the second distance value and the first distance value is not smaller than the first set value, sets the clamp signal to said second level, detects the third distance value, based on the integral signal output from said integrating means when the total integrating time for the output ratio signal in said integrating means is the third time, and calculates the distance to the object, based on a sum of the second distance value and the third distance value.

5. A distance measuring apparatus comprising:

light projecting means for projecting light toward an object at a distance to be measured;

light detecting means for detecting reflected light of the light projected toward the object, at a reception position on a position sensitive device according to the distance to the object, and for outputting a far signal, which increases with an increase in the distance if quantity of detected light is constant, and a near signal, which increases with a decrease in the distance if the quantity of detected light is constant;

clamping means receiving the far signal and comparing the far signal with a level of a clamp signal, wherein said clamping means outputs the far signal if the far signal is not less than the level of the clamp signal, and otherwise outputs the clamp signal;

arithmetic means for calculating a ratio of the near signal and a signal output from said clamping means to output an output ratio signal;

integrating means for cumulatively integrating the output ratio signal and outputting an integral signal according to the integrating; and control means for controlling each of projection of the light by said light projecting means, the level of the clamp signal in said clamping means, and total integrating time for the output ratio signal in said integrating means, and for detecting a distance value, based on the integral signal output from said integrating means, wherein said control means:

(a) sets the clamp signal to a first level, and detects a first distance value, based on the integral signal output from said integrating means when the total integrating time for the output ratio signal in said integrating means is a first time;

(b) when the first distance value is larger than a first set distance, sets the clamp signal to a second level smaller than the first level, and detects a second distance value, based on the integral signal output from said integrating means when the total integrating time for the output ratio signal in said integrating means is a second time;

(c) when either (i) a sum of the second distance value and the second distance value is not larger than a second set value, or (ii) the difference between the second distance value and the first distance value is not larger than a third set value and the difference between the second distance value and the first distance value is smaller than a first set value, sets the clamp signal to the first level, detects a third distance value, based on the integral signal output from said integrating means when the total integrating time for the output ratio signal in said integrating means is a third time, and calculates the distance to the object, based on a sum of the first distance value and the third distance value; and (d) when a sum of the second distance value and the second distance value is larger than a second set value and the difference between the second distance value and the first distance value is larger than a third set value, or, when either (i) the sum of the second distance value and the second distance value is not larger than the second set value, or (ii) the difference between the second distance value and the first distance value is not larger than the third set value and the difference between the second distance value and the first distance value is not smaller than the first set value, sets the clamp signal to the second level, detects the third distance value, based on the integral signal output from said integrating means when the total integrating time for the output ratio signal in said integrating means is the third number, and calculates the distance to the object, based on a sum of the second distance value and the third distance value.

6. A distance measuring apparatus comprising:

light projecting means for projecting light toward an object at a distance to be measured;

light detecting means for detecting reflected light of the light projected toward the object, at a reception position on a position sensitive device according to the distance to the object, and for outputting a far signal, which increases with an increase in the distance if quantity of detected light is constant, and a near signal, which increases with a decrease in the distance if the quantity of detected light is constant;

clamping means receiving the far signal and comparing the far signal with a level of a clamp signal, wherein said clamping means outputs the far signal if one far signal is not less than the level of the clamp signal, and otherwise outputs the clamp signal;

arithmetic means for calculating a ratio of the near signal and a signal output from said clamping means to output an output ratio signal;

integrating means for cumulatively integrating the output ratio signal in an integrating capacitor and outputting an integral signal according to the integrating; and control means for controlling each of projection of the light by said light projecting means, the level of the clamp signal in said clamping means, and total integrating time for the output ratio signal in said integrating means, and for detecting a distance value, based on the integral signal output from said integrating means, wherein said control means:

(a) sets the clamp signal to a first level, and detects a first distance value, based on the integral signal output from said integrating means when the total integrating time for the output ratio signal in said integrating means is a first time;

(b) sets the clamp signal to a second level, and detects a second distance value, based on the integral signal output from said integrating means when the total integrating time for the output ratio signal in said integrating means is a second time, shorter than the first time; and (c) corrects the second distance value by adding a predetermined value to the second distance value, and calculates the distance to the object, based on a sum of said first distance value and the second distance value after correction.

7. The distance measuring apparatus according to claim 6, wherein the second level of the clamp signal is no larger than the first level of the clamp signal.

8. A distance measuring apparatus comprising:

light projecting means for projecting light toward an object at a distance to be measured;

light detecting means for detecting reflected light of the light projected toward the object, at a reception position on a position sensitive device according to the distance to the object, and for outputting a far signal, which increases with an increase in the distance if quantity of detected light is constant, and a near signal, which increases with a decrease in the distance if the quantity of detected light is constant;

clamping means receiving the far signal and comparing the far signal with a level of a clamp signal, wherein said clamping means outputs the far signal if one far signal is not less than the level of the clamp signal, and otherwise outputs the clamp signal;

arithmetic means for calculating a ratio of the near signal and a signal output from said clamping means to output an output ratio signal;

integrating means for cumulatively integrating the output ratio signal in an integrating capacitor and outputting an integral signal according to the integrating; and control means for controlling each of projection of the light by said light projecting means, the level of the clamp signal in said clamping means, and total integrating time for the output ratio signal in said integrating means, and for detecting a distance value, based on the integral signal output from said integrating means, wherein said control means:

(a) sets the clamp signal to a first level, and detects a first distance value, based on the integral signal from said integrating means when the total integrating time for the output ratio signal in said integrating means is a first time;

(b) sets the clamp signal to a second level, and detects a second distance value, based on the integral signal from said integrating means when the total integrating time of the output ratio signal in said integrating means is a second time, shorter than the first time;

(c) corrects the second distance value by adding a first predetermined value to said second distance value;

(d) sets the clamp signal to a third level, and detects a third distance value, based on the integral signal outputted from said integrating means when the total integrating time for the output ratio signal in said integrating means is a third time, shorter than the first time;

(e) corrects the third distance value by adding a second predetermined value to the third distance value; and (f) calculates the distance to the object, based on a sum of said first distance value and the second distance value after correction or based on a sum of the second distance value and the third distance value after correction.

9. The distance measuring apparatus according to claim 8, wherein the second level of the clamp signal is no larger than the first level of the clamp signal, and the third level of the clamp signal is no larger than the first level of the clamp signal.

10. The distance measuring apparatus according to claim 8, wherein the first predetermined value added for correction of the second distance value is equal to the second predetermined value added for correction of the third distance value.

* * * * *